(12) United States Patent
Jaffari et al.

(10) Patent No.: US 10,460,669 B2
(45) Date of Patent: *Oct. 29, 2019

(54) SYSTEM AND METHODS FOR THERMAL COMPENSATION IN AMOLED DISPLAYS

(71) Applicant: Ignis Innovation Inc., Waterloo (CA)

(72) Inventors: Javid Jaffari, Kitchener (CA); Gholamreza Chaji, Waterloo (CA); Tong Liu, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,658

(22) Filed: May 15, 2018

(65) Prior Publication Data

US 2018/0261162 A1     Sep. 13, 2018

Related U.S. Application Data

(63) Continuation of application No. 15/289,138, filed on Oct. 8, 2016, now Pat. No. 9,997,110, which is a
(Continued)

(51) Int. Cl.
  *G09G 3/3258* (2016.01)
  *G06F 17/50* (2006.01)
  (Continued)

(52) U.S. Cl.
  CPC ....... *G09G 3/3258* (2013.01); *G06F 17/5018* (2013.01); *G09G 3/3233* (2013.01);
  (Continued)

(58) Field of Classification Search
  CPC ............ G06F 17/5018; G06F 2217/80; G09G 2300/0819
  See application file for complete search history.

(56) References Cited

U.S. PATENT DOCUMENTS

| 3,506,851 A | 4/1970 | Polkinghorn |
| 3,774,055 A | 11/1973 | Bapat |
(Continued)

FOREIGN PATENT DOCUMENTS

| CA | 1 294 034 | 1/1992 |
| CA | 2 109 951 | 11/1992 |
(Continued)

OTHER PUBLICATIONS

Ahnood : "Effect of threshold voltage instability on field effect mobility in thin film transistors deduced from constant current measurements"; dated Aug. 2009.
(Continued)

*Primary Examiner* — Chun-Nan Lin
(74) *Attorney, Agent, or Firm* — Stratford Managers Corporation

(57) ABSTRACT

Disclosed is a circuit and technique to determine the temperature of an AMOLED display in order to calibrate programming data signals. The temperature of selected pixels of a plurality of pixels in an AMOLED display is measured via one of several disclosed methods. A thermal sensor for the selected pixels may be used. A measurement of output voltage data may be used to estimate temperature. A finite element analysis model may be used based on consumed power of the selected pixel. The temperature data for the selected pixel is then interpolated to the neighboring non-selected pixels to estimate the temperature of those pixels.

24 Claims, 5 Drawing Sheets

Related U.S. Application Data continuation of application No. 14/481,520, filed on Sep. 9, 2014, now Pat. No. 9,489,897, which is a continuation of application No. 12/958,655, filed on Dec. 2, 2010, now Pat. No. 8,907,991.

(51) Int. Cl.
  *G09G 3/3233* (2016.01)
  *G09G 3/3291* (2016.01)

(52) U.S. Cl.
  CPC ....... *G09G 3/3291* (2013.01); *G06F 2217/80* (2013.01); *G09G 2300/0819* (2013.01); *G09G 2310/0289* (2013.01); *G09G 2320/029* (2013.01); *G09G 2320/0233* (2013.01); *G09G 2320/0271* (2013.01); *G09G 2320/041* (2013.01); *G09G 2320/0626* (2013.01); *G09G 2320/0693* (2013.01)

(56) References Cited

U.S. PATENT DOCUMENTS

| | | |
|---|---|---|
| 4,090,096 A | 5/1978 | Nagami |
| 4,160,934 A | 7/1979 | Kirsch |
| 4,354,162 A | 10/1982 | Wright |
| 4,943,956 A | 7/1990 | Noro |
| 4,996,523 A | 2/1991 | Bell |
| 5,153,420 A | 10/1992 | Hack |
| 5,198,803 A | 3/1993 | Shie |
| 5,204,661 A | 4/1993 | Hack |
| 5,266,515 A | 11/1993 | Robb |
| 5,276,542 A | 1/1994 | Iwayama |
| 5,489,918 A | 2/1996 | Mosier |
| 5,498,880 A | 3/1996 | Lee |
| 5,557,342 A | 9/1996 | Eto |
| 5,572,444 A | 11/1996 | Lentz |
| 5,589,847 A | 12/1996 | Lewis |
| 5,594,463 A | 1/1997 | Sakamoto |
| 5,619,033 A | 4/1997 | Weisfield |
| 5,648,276 A | 7/1997 | Hara |
| 5,670,973 A | 9/1997 | Bassetti |
| 5,684,365 A | 11/1997 | Tang |
| 5,691,783 A | 11/1997 | Numao |
| 5,714,968 A | 2/1998 | Ikeda |
| 5,723,950 A | 3/1998 | Wei |
| 5,744,824 A | 4/1998 | Kousai |
| 5,745,660 A | 4/1998 | Kolpatzik |
| 5,748,160 A | 5/1998 | Shieh |
| 5,815,303 A | 9/1998 | Berlin |
| 5,870,071 A | 2/1999 | Kawahata |
| 5,874,803 A | 2/1999 | Garbuzov |
| 5,880,582 A | 3/1999 | Sawada |
| 5,903,248 A | 5/1999 | Irwin |
| 5,917,280 A | 6/1999 | Burrows |
| 5,923,794 A | 7/1999 | McGrath |
| 5,945,972 A | 8/1999 | Okumura |
| 5,949,398 A | 9/1999 | Kim |
| 5,952,789 A | 9/1999 | Stewart |
| 5,952,991 A | 9/1999 | Akiyama |
| 5,982,104 A | 11/1999 | Sasaki |
| 5,990,629 A | 11/1999 | Yamada |
| 6,023,259 A | 2/2000 | Howard |
| 6,037,920 A | 3/2000 | Mizutome |
| 6,069,365 A | 5/2000 | Chow |
| 6,091,203 A | 7/2000 | Kawashima |
| 6,097,360 A | 8/2000 | Holloman |
| 6,144,222 A | 11/2000 | Ho |
| 6,177,915 B1 | 1/2001 | Beeteson |
| 6,229,506 B1 | 5/2001 | Dawson |
| 6,229,508 B1 | 5/2001 | Kane |
| 6,246,180 B1 | 6/2001 | Nishigaki |
| 6,252,248 B1 | 6/2001 | Sano |
| 6,259,424 B1 | 7/2001 | Kurogane |
| 6,262,589 B1 | 7/2001 | Tamukai |
| 6,271,825 B1 | 8/2001 | Greene |
| 6,288,696 B1 | 9/2001 | Holloman |
| 6,304,039 B1 | 10/2001 | Appelberg |
| 6,307,322 B1 | 10/2001 | Dawson |
| 6,310,962 B1 | 10/2001 | Chung |
| 6,313,821 B1 | 11/2001 | Mizuno |
| 6,320,325 B1 | 11/2001 | Cok |
| 6,323,631 B1 | 11/2001 | Juang |
| 6,329,971 B2 | 12/2001 | McKnight |
| 6,356,029 B1 | 3/2002 | Hunter |
| 6,373,454 B1 | 4/2002 | Knapp |
| 6,376,994 B1 | 4/2002 | Ochi |
| 6,392,617 B1 | 5/2002 | Gleason |
| 6,404,139 B1 | 6/2002 | Sasaki et al. |
| 6,414,661 B1 | 7/2002 | Shen |
| 6,417,825 B1 | 7/2002 | Stewart |
| 6,426,737 B1 | 7/2002 | MacLean |
| 6,433,488 B1 | 8/2002 | Bu |
| 6,437,106 B1 | 8/2002 | Stoner |
| 6,445,369 B1 | 9/2002 | Yang |
| 6,475,845 B2 | 11/2002 | Kimura |
| 6,501,098 B2 | 12/2002 | Yamazaki |
| 6,501,466 B1 | 12/2002 | Yamagishi |
| 6,518,962 B2 | 2/2003 | Kimura |
| 6,522,315 B2 | 2/2003 | Ozawa |
| 6,525,683 B1 | 2/2003 | Gu |
| 6,531,827 B2 | 3/2003 | Kawashima |
| 6,542,138 B1 | 4/2003 | Shannon |
| 6,555,420 B1 | 4/2003 | Yamazaki |
| 6,577,302 B2 | 6/2003 | Hunter |
| 6,580,408 B1 | 6/2003 | Bae |
| 6,580,657 B2 | 6/2003 | Sanford |
| 6,583,398 B2 | 6/2003 | Harkin |
| 6,583,775 B1 | 6/2003 | Sekiya |
| 6,594,606 B2 | 7/2003 | Everitt |
| 6,618,030 B2 | 9/2003 | Kane |
| 6,639,244 B1 | 10/2003 | Yamazaki |
| 6,668,645 B1 | 12/2003 | Gilmour |
| 6,677,713 B1 | 1/2004 | Sung |
| 6,680,580 B1 | 1/2004 | Sung |
| 6,687,266 B1 | 2/2004 | Ma |
| 6,690,000 B1 | 2/2004 | Muramatsu |
| 6,690,344 B1 | 2/2004 | Takeuchi |
| 6,693,388 B2 | 2/2004 | Oomura |
| 6,693,610 B2 | 2/2004 | Shannon |
| 6,697,057 B2 | 2/2004 | Koyama |
| 6,720,942 B2 | 4/2004 | Lee |
| 6,724,151 B2 | 4/2004 | Yoo |
| 6,734,636 B2 | 5/2004 | Sanford |
| 6,738,034 B2 | 5/2004 | Kaneko |
| 6,738,035 B1 | 5/2004 | Fan |
| 6,753,655 B2 | 6/2004 | Shih |
| 6,753,834 B2 | 6/2004 | Mikami |
| 6,756,741 B2 | 6/2004 | Li |
| 6,756,952 B1 | 6/2004 | Decaux |
| 6,756,958 B2 | 6/2004 | Furuhashi |
| 6,771,028 B1 | 8/2004 | Winters |
| 6,777,712 B2 | 8/2004 | Sanford |
| 6,777,888 B2 | 8/2004 | Kondo |
| 6,781,567 B2 | 8/2004 | Kimura |
| 6,806,497 B2 | 10/2004 | Jo |
| 6,806,638 B2 | 10/2004 | Lih et al. |
| 6,806,857 B2 | 10/2004 | Sempel |
| 6,809,706 B2 | 10/2004 | Shimoda |
| 6,815,975 B2 | 11/2004 | Nara |
| 6,828,950 B2 | 12/2004 | Koyama |
| 6,853,371 B2 | 2/2005 | Miyajima |
| 6,859,193 B1 | 2/2005 | Yumoto |
| 6,873,117 B2 | 3/2005 | Ishizuka |
| 6,876,346 B2 | 4/2005 | Anzai |
| 6,885,356 B2 | 4/2005 | Hashimoto |
| 6,885,412 B2 | 4/2005 | Ohnishi |
| 6,900,485 B2 | 5/2005 | Lee |
| 6,903,734 B2 | 6/2005 | Eu |
| 6,909,243 B2 | 6/2005 | Inukai |
| 6,909,419 B2 | 6/2005 | Zavracky |
| 6,911,960 B1 | 6/2005 | Yokoyama |
| 6,911,964 B2 | 6/2005 | Lee |
| 6,914,448 B2 | 7/2005 | Jinno |
| 6,919,871 B2 | 7/2005 | Kwon |

(56) References Cited

U.S. PATENT DOCUMENTS

| | | |
|---|---|---|
| 6,924,602 B2 | 8/2005 | Komiya |
| 6,937,215 B2 | 8/2005 | Lo |
| 6,937,220 B2 | 8/2005 | Kitaura |
| 6,940,214 B1 | 9/2005 | Komiya |
| 6,943,500 B2 | 9/2005 | LeChevalier |
| 6,947,022 B2 | 9/2005 | McCartney |
| 6,954,194 B2 | 10/2005 | Matsumoto |
| 6,956,547 B2 | 10/2005 | Bae |
| 6,975,142 B2 | 12/2005 | Azami |
| 6,975,332 B2 | 12/2005 | Arnold |
| 6,995,510 B2 | 2/2006 | Murakami |
| 6,995,519 B2 | 2/2006 | Arnold |
| 7,012,584 B2 | 3/2006 | Muruyama |
| 7,023,408 B2 | 4/2006 | Chen |
| 7,027,015 B2 | 4/2006 | Booth, Jr. |
| 7,027,078 B2 | 4/2006 | Reihl |
| 7,034,793 B2 | 4/2006 | Sekiya |
| 7,036,939 B2 | 5/2006 | Cole |
| 7,038,392 B2 | 5/2006 | Libsch |
| 7,057,359 B2 | 6/2006 | Hung |
| 7,061,451 B2 | 6/2006 | Kimura |
| 7,064,733 B2 | 6/2006 | Cok |
| 7,071,932 B2 | 7/2006 | Libsch |
| 7,088,051 B1 | 8/2006 | Cok |
| 7,088,052 B2 | 8/2006 | Kimura |
| 7,102,378 B2 | 9/2006 | Kuo |
| 7,106,285 B2 | 9/2006 | Naugler |
| 7,112,820 B2 | 9/2006 | Chang |
| 7,116,058 B2 | 10/2006 | Lo |
| 7,119,493 B2 | 10/2006 | Fryer |
| 7,122,835 B1 | 10/2006 | Ikeda |
| 7,127,380 B1 | 10/2006 | Iverson |
| 7,129,914 B2 | 10/2006 | Knapp |
| 7,161,566 B2 | 1/2007 | Cok |
| 7,164,417 B2 | 1/2007 | Cok |
| 7,193,589 B2 | 3/2007 | Yoshida |
| 7,224,332 B2 | 5/2007 | Cok |
| 7,227,519 B1 | 6/2007 | Kawase |
| 7,245,277 B2 | 7/2007 | Ishizuka |
| 7,248,236 B2 | 7/2007 | Nathan |
| 7,262,753 B2 | 8/2007 | Tanghe |
| 7,274,363 B2 | 9/2007 | Ishizuka |
| 7,310,092 B2 | 12/2007 | Imamura |
| 7,315,295 B2 | 1/2008 | Kimura |
| 7,321,348 B2 | 1/2008 | Cok |
| 7,339,560 B2 | 3/2008 | Sun |
| 7,355,574 B1 | 4/2008 | Leon |
| 7,358,941 B2 | 4/2008 | Ono |
| 7,368,868 B2 | 5/2008 | Sakamoto |
| 7,397,485 B2 | 7/2008 | Miller |
| 7,411,571 B2 | 8/2008 | Huh |
| 7,414,600 B2 | 8/2008 | Nathan |
| 7,423,617 B2 | 9/2008 | Giraldo |
| 7,453,054 B2 | 11/2008 | Lee |
| 7,474,285 B2 | 1/2009 | Kimura |
| 7,502,000 B2 | 3/2009 | Yuki |
| 7,528,812 B2 | 5/2009 | Tsuge |
| 7,535,449 B2 | 5/2009 | Miyazawa |
| 7,554,512 B2 | 6/2009 | Steer |
| 7,554,627 B2 | 6/2009 | You |
| 7,569,849 B2 | 8/2009 | Nathan |
| 7,576,718 B2 | 8/2009 | Miyazawa |
| 7,580,012 B2 | 8/2009 | Kim |
| 7,589,707 B2 | 9/2009 | Chou |
| 7,592,995 B2 | 9/2009 | Sugino |
| 7,609,239 B2 | 10/2009 | Chang |
| 7,619,594 B2 | 11/2009 | Hu |
| 7,619,597 B2 | 11/2009 | Nathan |
| 7,633,470 B2 | 12/2009 | Kane |
| 7,652,645 B2 | 1/2010 | Park |
| 7,656,370 B2 | 2/2010 | Schneider |
| 7,675,485 B2 | 3/2010 | Steer |
| 7,755,592 B2 | 7/2010 | Ham |
| 7,800,558 B2 | 9/2010 | Routley |
| 7,847,764 B2 | 12/2010 | Cok |
| 7,859,492 B2 | 12/2010 | Kohno |
| 7,868,859 B2 | 1/2011 | Tomida |
| 7,876,294 B2 | 1/2011 | Sasaki |
| 7,924,249 B2 | 4/2011 | Nathan |
| 7,932,883 B2 | 4/2011 | Klompenhouwer |
| 7,969,390 B2 | 6/2011 | Yoshida |
| 7,978,187 B2 | 7/2011 | Nathan |
| 7,994,712 B2 | 8/2011 | Sung |
| 8,026,876 B2 | 9/2011 | Nathan |
| 8,049,420 B2 | 11/2011 | Tamura |
| 8,077,123 B2 | 12/2011 | Naugler, Jr. |
| 8,115,707 B2 | 2/2012 | Nathan |
| 8,208,084 B2 | 6/2012 | Lin |
| 8,223,177 B2 | 7/2012 | Nathan |
| 8,232,939 B2 | 7/2012 | Nathan |
| 8,259,044 B2 | 9/2012 | Nathan |
| 8,264,431 B2 | 9/2012 | Bulovic |
| 8,279,143 B2 | 10/2012 | Nathan |
| 8,319,936 B2 | 11/2012 | Yoshida |
| 8,339,386 B2 | 12/2012 | Leon |
| 8,441,206 B2 | 5/2013 | Myers |
| 8,493,296 B2 | 7/2013 | Ogawa |
| 9,489,897 B2 * | 11/2016 | Jaffari ................ G06F 17/5018 |
| 2001/0002703 A1 | 6/2001 | Koyama |
| 2001/0009283 A1 | 7/2001 | Arao |
| 2001/0024181 A1 | 9/2001 | Kubota |
| 2001/0024186 A1 | 9/2001 | Kane |
| 2001/0026257 A1 | 10/2001 | Kimura |
| 2001/0030323 A1 | 10/2001 | Ikeda |
| 2001/0035863 A1 | 11/2001 | Kimura |
| 2001/0038367 A1 | 11/2001 | Inukai |
| 2001/0040541 A1 | 11/2001 | Yoneda |
| 2001/0043173 A1 | 11/2001 | Troutman |
| 2001/0045929 A1 | 11/2001 | Prache |
| 2001/0052606 A1 | 12/2001 | Sempel |
| 2001/0052940 A1 | 12/2001 | Hagihara |
| 2002/0000576 A1 | 1/2002 | Inukai |
| 2002/0011796 A1 | 1/2002 | Koyama |
| 2002/0011799 A1 | 1/2002 | Kimura |
| 2002/0012057 A1 | 1/2002 | Kimura |
| 2002/0014851 A1 | 2/2002 | Tai |
| 2002/0018034 A1 | 2/2002 | Ohki |
| 2002/0030190 A1 | 3/2002 | Ohtani |
| 2002/0047565 A1 | 4/2002 | Nara |
| 2002/0052086 A1 | 5/2002 | Maeda |
| 2002/0067134 A1 | 6/2002 | Kawashima |
| 2002/0084463 A1 | 7/2002 | Sanford |
| 2002/0101152 A1 | 8/2002 | Kimura |
| 2002/0101172 A1 | 8/2002 | Bu |
| 2002/0105279 A1 | 8/2002 | Kimura |
| 2002/0117722 A1 | 8/2002 | Osada |
| 2002/0122308 A1 | 9/2002 | Ikeda |
| 2002/0158587 A1 | 10/2002 | Komiya |
| 2002/0158666 A1 | 10/2002 | Azami |
| 2002/0158823 A1 | 10/2002 | Zavracky |
| 2002/0167471 A1 | 11/2002 | Everitt |
| 2002/0167474 A1 | 11/2002 | Everitt |
| 2002/0180369 A1 | 12/2002 | Koyama |
| 2002/0180721 A1 | 12/2002 | Kimura |
| 2002/0181276 A1 | 12/2002 | Yamazaki |
| 2002/0186214 A1 | 12/2002 | Siwinski |
| 2002/0190924 A1 | 12/2002 | Asano |
| 2002/0190971 A1 | 12/2002 | Nakamura |
| 2002/0195967 A1 | 12/2002 | Kim |
| 2002/0195968 A1 | 12/2002 | Sanford |
| 2003/0020413 A1 | 1/2003 | Oomura |
| 2003/0030603 A1 | 2/2003 | Shimoda |
| 2003/0043088 A1 | 3/2003 | Booth |
| 2003/0048243 A1 | 3/2003 | Kwasnick |
| 2003/0057895 A1 | 3/2003 | Kimura |
| 2003/0058226 A1 | 3/2003 | Bertram |
| 2003/0062524 A1 | 4/2003 | Kimura |
| 2003/0063081 A1 | 4/2003 | Kimura |
| 2003/0071821 A1 | 4/2003 | Sundahl |
| 2003/0076048 A1 | 4/2003 | Rutherford |
| 2003/0090447 A1 | 5/2003 | Kimura |
| 2003/0090481 A1 | 5/2003 | Kimura |
| 2003/0107560 A1 | 6/2003 | Yumoto |
| 2003/0111966 A1 | 6/2003 | Mikami |

(56) References Cited

U.S. PATENT DOCUMENTS

| | | |
|---|---|---|
| 2003/0122745 A1 | 7/2003 | Miyazawa |
| 2003/0122813 A1 | 7/2003 | Ishizuki |
| 2003/0142088 A1 | 7/2003 | LeChevalier |
| 2003/0151569 A1 | 8/2003 | Lee |
| 2003/0156101 A1 | 8/2003 | Le Chevalier |
| 2003/0169241 A1 | 9/2003 | LeChevalier |
| 2003/0174152 A1 | 9/2003 | Noguchi |
| 2003/0179626 A1 | 9/2003 | Sanford |
| 2003/0185438 A1 | 10/2003 | Osawa |
| 2003/0197663 A1 | 10/2003 | Lee |
| 2003/0210256 A1 | 11/2003 | Mori |
| 2003/0230141 A1 | 12/2003 | Gilmour |
| 2003/0230980 A1 | 12/2003 | Forrest |
| 2003/0231148 A1 | 12/2003 | Lin |
| 2004/0032382 A1 | 2/2004 | Cok |
| 2004/0041750 A1 | 3/2004 | Abe |
| 2004/0066357 A1 | 4/2004 | Kawasaki |
| 2004/0070557 A1 | 4/2004 | Asano |
| 2004/0070565 A1 | 4/2004 | Nayar |
| 2004/0090186 A1 | 5/2004 | Kanauchi |
| 2004/0090400 A1 | 5/2004 | Yoo |
| 2004/0095297 A1 | 5/2004 | Libsch |
| 2004/0100427 A1 | 5/2004 | Miyazawa |
| 2004/0108518 A1 | 6/2004 | Jo |
| 2004/0108978 A1 | 6/2004 | Matsueda |
| 2004/0135749 A1 | 7/2004 | Kondakov |
| 2004/0140982 A1 | 7/2004 | Pate |
| 2004/0145547 A1 | 7/2004 | Oh |
| 2004/0150592 A1 | 8/2004 | Mizukoshi |
| 2004/0150594 A1 | 8/2004 | Koyama |
| 2004/0150595 A1 | 8/2004 | Kasai |
| 2004/0155841 A1 | 8/2004 | Kasai |
| 2004/0164935 A1 | 8/2004 | Dedene |
| 2004/0174347 A1 | 9/2004 | Sun |
| 2004/0174349 A1 | 9/2004 | Libsch |
| 2004/0174354 A1 | 9/2004 | Ono |
| 2004/0178743 A1 | 9/2004 | Miller |
| 2004/0183759 A1 | 9/2004 | Stevenson |
| 2004/0196275 A1 | 10/2004 | Hattori |
| 2004/0207615 A1 | 10/2004 | Yumoto |
| 2004/0227697 A1 | 11/2004 | Mori |
| 2004/0233125 A1 | 11/2004 | Tanghe |
| 2004/0239596 A1 | 12/2004 | Ono |
| 2004/0252089 A1 | 12/2004 | Ono |
| 2004/0257313 A1 | 12/2004 | Kawashima |
| 2004/0257353 A1 | 12/2004 | Imamura |
| 2004/0257355 A1 | 12/2004 | Naugler |
| 2004/0263437 A1 | 12/2004 | Hattori |
| 2004/0263444 A1 | 12/2004 | Kimura |
| 2004/0263445 A1 | 12/2004 | Inukai |
| 2004/0263541 A1 | 12/2004 | Takeuchi |
| 2005/0007355 A1 | 1/2005 | Miura |
| 2005/0007357 A1 | 1/2005 | Yamashita |
| 2005/0007392 A1 | 1/2005 | Kasai |
| 2005/0017650 A1 | 1/2005 | Fryer |
| 2005/0017922 A1 | 1/2005 | Devos |
| 2005/0024081 A1 | 2/2005 | Kuo |
| 2005/0024303 A1 | 2/2005 | Kimura |
| 2005/0024393 A1 | 2/2005 | Kondo |
| 2005/0030267 A1* | 2/2005 | Tanghe ........... G09G 3/3216 345/82 |
| 2005/0057484 A1 | 3/2005 | Diefenbaugh |
| 2005/0057580 A1 | 3/2005 | Yamano |
| 2005/0067970 A1 | 3/2005 | Libsch |
| 2005/0067971 A1 | 3/2005 | Kane |
| 2005/0068270 A1 | 3/2005 | Awakura |
| 2005/0068275 A1 | 3/2005 | Kane |
| 2005/0073264 A1 | 4/2005 | Matsumoto |
| 2005/0083323 A1 | 4/2005 | Suzuki |
| 2005/0088103 A1 | 4/2005 | Kageyama |
| 2005/0110420 A1 | 5/2005 | Arnold |
| 2005/0110807 A1 | 5/2005 | Chang |
| 2005/0122294 A1 | 6/2005 | Ben-David |
| 2005/0140598 A1 | 6/2005 | Kim |
| 2005/0140610 A1 | 6/2005 | Smith |
| 2005/0145891 A1 | 7/2005 | Abe |
| 2005/0156831 A1 | 7/2005 | Yamazaki |
| 2005/0162079 A1 | 7/2005 | Sakamoto |
| 2005/0168416 A1 | 8/2005 | Hashimoto |
| 2005/0179626 A1 | 8/2005 | Yuki |
| 2005/0179628 A1 | 8/2005 | Kimura |
| 2005/0185200 A1 | 8/2005 | Tobol |
| 2005/0200575 A1 | 9/2005 | Kim |
| 2005/0206590 A1 | 9/2005 | Sasaki |
| 2005/0212787 A1 | 9/2005 | Noguchi |
| 2005/0219184 A1 | 10/2005 | Zehner |
| 2005/0225683 A1 | 10/2005 | Nozawa |
| 2005/0248515 A1 | 11/2005 | Naugler |
| 2005/0269959 A1 | 12/2005 | Uchino |
| 2005/0269960 A1 | 12/2005 | Ono |
| 2005/0280615 A1 | 12/2005 | Cok |
| 2005/0280766 A1 | 12/2005 | Johnson |
| 2005/0285822 A1 | 12/2005 | Reddy |
| 2005/0285825 A1 | 12/2005 | Eom |
| 2006/0001613 A1 | 1/2006 | Routley |
| 2006/0007072 A1 | 1/2006 | Choi |
| 2006/0007206 A1 | 1/2006 | Reddy et al. |
| 2006/0007249 A1 | 1/2006 | Reddy |
| 2006/0012310 A1 | 1/2006 | Chen |
| 2006/0012311 A1 | 1/2006 | Ogawa |
| 2006/0015272 A1 | 1/2006 | Giraldo et al. |
| 2006/0022305 A1 | 2/2006 | Yamashita |
| 2006/0027807 A1 | 2/2006 | Nathan |
| 2006/0030084 A1 | 2/2006 | Young |
| 2006/0038758 A1 | 2/2006 | Routley |
| 2006/0038762 A1 | 2/2006 | Chou |
| 2006/0044227 A1 | 3/2006 | Hadcock |
| 2006/0061248 A1 | 3/2006 | Cok |
| 2006/0066533 A1 | 3/2006 | Sato |
| 2006/0077134 A1 | 4/2006 | Hector et al. |
| 2006/0077135 A1 | 4/2006 | Cok |
| 2006/0077142 A1 | 4/2006 | Kwon |
| 2006/0082523 A1 | 4/2006 | Guo |
| 2006/0092185 A1 | 5/2006 | Jo |
| 2006/0097628 A1 | 5/2006 | Suh |
| 2006/0097631 A1 | 5/2006 | Lee |
| 2006/0103611 A1 | 5/2006 | Choi |
| 2006/0125740 A1 | 6/2006 | Shirasaki et al. |
| 2006/0149493 A1 | 7/2006 | Sambandan |
| 2006/0170623 A1 | 8/2006 | Naugler, Jr. |
| 2006/0176250 A1 | 8/2006 | Nathan |
| 2006/0204126 A1 | 9/2006 | Kanda |
| 2006/0208961 A1 | 9/2006 | Nathan |
| 2006/0208971 A1 | 9/2006 | Deane |
| 2006/0214888 A1 | 9/2006 | Schneider |
| 2006/0231740 A1 | 10/2006 | Kasai |
| 2006/0232522 A1 | 10/2006 | Roy |
| 2006/0244697 A1 | 11/2006 | Lee |
| 2006/0256048 A1 | 11/2006 | Fish et al. |
| 2006/0261841 A1 | 11/2006 | Fish |
| 2006/0273997 A1 | 12/2006 | Nathan |
| 2006/0279481 A1 | 12/2006 | Haruna |
| 2006/0284801 A1 | 12/2006 | Yoon |
| 2006/0284802 A1 | 12/2006 | Kohno |
| 2006/0284895 A1 | 12/2006 | Marcu |
| 2006/0290614 A1 | 12/2006 | Nathan |
| 2006/0290618 A1 | 12/2006 | Goto |
| 2007/0001937 A1 | 1/2007 | Park |
| 2007/0001939 A1 | 1/2007 | Hashimoto |
| 2007/0008251 A1 | 1/2007 | Kohno |
| 2007/0008268 A1 | 1/2007 | Park |
| 2007/0008297 A1 | 1/2007 | Bassetti |
| 2007/0013794 A1 | 1/2007 | Tsuruoka |
| 2007/0040696 A1 | 2/2007 | Mubaslat |
| 2007/0057873 A1 | 3/2007 | Uchino |
| 2007/0057874 A1 | 3/2007 | Le Roy |
| 2007/0069998 A1 | 3/2007 | Naugler |
| 2007/0075727 A1 | 4/2007 | Nakano |
| 2007/0075940 A1 | 4/2007 | Nakamura |
| 2007/0076226 A1 | 4/2007 | Klompenhouwer |
| 2007/0080905 A1 | 4/2007 | Takahara |
| 2007/0080906 A1 | 4/2007 | Tanabe |
| 2007/0080908 A1 | 4/2007 | Nathan |
| 2007/0097038 A1 | 5/2007 | Yamazaki |

(56) References Cited

U.S. PATENT DOCUMENTS

| | | |
|---|---|---|
| 2007/0097041 A1 | 5/2007 | Park |
| 2007/0103411 A1 | 5/2007 | Cok et al. |
| 2007/0103419 A1 | 5/2007 | Uchino |
| 2007/0115221 A1 | 5/2007 | Buchhauser |
| 2007/0126672 A1 | 6/2007 | Tada et al. |
| 2007/0164664 A1 | 7/2007 | Ludwicki |
| 2007/0164938 A1 | 7/2007 | Shin |
| 2007/0182671 A1 | 8/2007 | Nathan |
| 2007/0236134 A1 | 10/2007 | Ho |
| 2007/0236440 A1 | 10/2007 | Wacyk |
| 2007/0236517 A1 | 10/2007 | Kimpe |
| 2007/0241999 A1 | 10/2007 | Lin |
| 2007/0252614 A1 | 11/2007 | Jeon |
| 2007/0273294 A1 | 11/2007 | Nagayama |
| 2007/0285359 A1 | 12/2007 | Ono |
| 2007/0290957 A1 | 12/2007 | Cok |
| 2007/0290958 A1 | 12/2007 | Cok |
| 2007/0296672 A1 | 12/2007 | Kim |
| 2008/0001525 A1 | 1/2008 | Chao |
| 2008/0001544 A1 | 1/2008 | Murakami |
| 2008/0012804 A1* | 1/2008 | Kim .................. G09G 3/3233 345/82 |
| 2008/0030518 A1 | 2/2008 | Higgins |
| 2008/0036706 A1 | 2/2008 | Kitazawa |
| 2008/0036708 A1 | 2/2008 | Shirasaki |
| 2008/0042942 A1 | 2/2008 | Takahashi |
| 2008/0042948 A1 | 2/2008 | Yamashita |
| 2008/0048951 A1 | 2/2008 | Naugler, Jr. |
| 2008/0055209 A1 | 3/2008 | Cok |
| 2008/0055211 A1 | 3/2008 | Ogawa |
| 2008/0074413 A1 | 3/2008 | Ogura |
| 2008/0088545 A1 | 4/2008 | Chen |
| 2008/0088549 A1 | 4/2008 | Nathan |
| 2008/0088648 A1 | 4/2008 | Nathan |
| 2008/0111766 A1 | 5/2008 | Uchino |
| 2008/0116787 A1 | 5/2008 | Hsu |
| 2008/0117144 A1 | 5/2008 | Nakano et al. |
| 2008/0136770 A1 | 6/2008 | Peker et al. |
| 2008/0150845 A1 | 6/2008 | Ishii |
| 2008/0150847 A1 | 6/2008 | Kim |
| 2008/0158115 A1 | 7/2008 | Cordes |
| 2008/0158648 A1 | 7/2008 | Cummings |
| 2008/0170004 A1* | 7/2008 | Jung .................. G09G 3/3233 345/76 |
| 2008/0191976 A1 | 8/2008 | Nathan |
| 2008/0198103 A1 | 8/2008 | Toyomura |
| 2008/0211749 A1 | 9/2008 | Weitbruch |
| 2008/0218451 A1 | 9/2008 | Miyamoto |
| 2008/0224962 A1 | 9/2008 | Kasai |
| 2008/0231558 A1 | 9/2008 | Naugler |
| 2008/0231562 A1 | 9/2008 | Kwon |
| 2008/0231625 A1 | 9/2008 | Minami |
| 2008/0246713 A1 | 10/2008 | Lee |
| 2008/0246903 A1 | 10/2008 | Park |
| 2008/0252223 A1 | 10/2008 | Toyoda |
| 2008/0252571 A1 | 10/2008 | Hente |
| 2008/0259020 A1 | 10/2008 | Fisekovic |
| 2008/0290805 A1 | 11/2008 | Yamada |
| 2008/0297055 A1 | 12/2008 | Miyake |
| 2009/0002578 A1 | 1/2009 | Araki |
| 2009/0021669 A1 | 1/2009 | Lee |
| 2009/0033598 A1 | 2/2009 | Suh |
| 2009/0058772 A1 | 3/2009 | Lee |
| 2009/0109142 A1 | 4/2009 | Takahara |
| 2009/0121994 A1 | 5/2009 | Miyata |
| 2009/0146926 A1 | 6/2009 | Sung |
| 2009/0160743 A1 | 6/2009 | Tomida |
| 2009/0174628 A1 | 7/2009 | Wang |
| 2009/0179832 A1 | 7/2009 | Kohno |
| 2009/0184901 A1 | 7/2009 | Kwon |
| 2009/0195483 A1 | 8/2009 | Naugler, Jr. |
| 2009/0201281 A1 | 8/2009 | Routley |
| 2009/0201318 A1 | 8/2009 | Silverstein |
| 2009/0206764 A1 | 8/2009 | Schemmann |
| 2009/0207160 A1 | 8/2009 | Shirasaki et al. |
| 2009/0213046 A1 | 8/2009 | Nam |
| 2009/0244043 A1 | 10/2009 | Kasai |
| 2009/0244046 A1 | 10/2009 | Seto |
| 2009/0262047 A1 | 10/2009 | Yamashita |
| 2010/0004891 A1 | 1/2010 | Ahlers |
| 2010/0026725 A1 | 2/2010 | Smith |
| 2010/0039422 A1 | 2/2010 | Seto |
| 2010/0039458 A1 | 2/2010 | Nathan |
| 2010/0045646 A1 | 2/2010 | Kishi |
| 2010/0045650 A1 | 2/2010 | Fish et al. |
| 2010/0060911 A1 | 3/2010 | Marcu |
| 2010/0079419 A1 | 4/2010 | Shibusawa |
| 2010/0085282 A1 | 4/2010 | Yu |
| 2010/0097504 A1 | 4/2010 | Nakano |
| 2010/0103160 A1 | 4/2010 | Jeon |
| 2010/0103203 A1 | 4/2010 | Choi |
| 2010/0134469 A1 | 6/2010 | Ogura et al. |
| 2010/0134475 A1 | 6/2010 | Ogura et al. |
| 2010/0165002 A1 | 7/2010 | Ahn |
| 2010/0194670 A1 | 8/2010 | Cok |
| 2010/0207960 A1 | 8/2010 | Kimpe |
| 2010/0214505 A1 | 8/2010 | Kim |
| 2010/0225630 A1 | 9/2010 | Levey |
| 2010/0245721 A1 | 9/2010 | Chang |
| 2010/0251295 A1 | 9/2010 | Amento |
| 2010/0277400 A1 | 11/2010 | Jeong |
| 2010/0302231 A1 | 12/2010 | Peng |
| 2010/0315319 A1 | 12/2010 | Cok |
| 2011/0050870 A1 | 3/2011 | Hanari |
| 2011/0063197 A1 | 3/2011 | Chung |
| 2011/0069051 A1 | 3/2011 | Nakamura |
| 2011/0069089 A1 | 3/2011 | Kopf |
| 2011/0069096 A1 | 3/2011 | Li |
| 2011/0074750 A1 | 3/2011 | Leon |
| 2011/0074762 A1 | 3/2011 | Shirasaki et al. |
| 2011/0134106 A1 | 6/2011 | Reis |
| 2011/0149166 A1 | 6/2011 | Botzas |
| 2011/0169798 A1 | 7/2011 | Lee |
| 2011/0175895 A1 | 7/2011 | Hayakawa |
| 2011/0181630 A1 | 7/2011 | Smith |
| 2011/0199395 A1 | 8/2011 | Nathan |
| 2011/0227964 A1 | 9/2011 | Chaji |
| 2011/0242074 A1 | 10/2011 | Bert et al. |
| 2011/0273399 A1 | 11/2011 | Lee |
| 2011/0292006 A1 | 12/2011 | Kim |
| 2011/0293480 A1 | 12/2011 | Mueller |
| 2012/0013581 A1 | 1/2012 | Nathan |
| 2012/0056558 A1 | 3/2012 | Toshiya |
| 2012/0062565 A1 | 3/2012 | Fuchs |
| 2012/0127193 A1 | 5/2012 | Bratt |
| 2012/0139955 A1 | 6/2012 | Jaffari |
| 2012/0169793 A1 | 7/2012 | Nathan |
| 2012/0262184 A1 | 10/2012 | Shen |
| 2012/0299970 A1 | 11/2012 | Bae |
| 2012/0299978 A1 | 11/2012 | Chaji |
| 2013/0027381 A1 | 1/2013 | Nathan |
| 2013/0032694 A1 | 2/2013 | Nakata |
| 2013/0057595 A1 | 3/2013 | Nathan |
| 2013/0057808 A1 | 3/2013 | Mizusako |
| 2013/0112960 A1 | 5/2013 | Chaji |
| 2013/0135272 A1 | 5/2013 | Park |
| 2013/0162617 A1 | 6/2013 | Yoon |
| 2013/0201223 A1 | 8/2013 | Li et al. |
| 2013/0309821 A1 | 11/2013 | Yoo |
| 2013/0321671 A1 | 12/2013 | Cote |
| 2014/0015824 A1 | 1/2014 | Chaji et al. |
| 2014/0043316 A1 | 2/2014 | Chaji et al. |
| 2014/0055500 A1 | 2/2014 | Lai |
| 2014/0111567 A1 | 4/2014 | Nathan et al. |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 438 577 | 8/2002 |

(56) References Cited

FOREIGN PATENT DOCUMENTS

| | | |
|---|---|---|
| CA | 2 463 653 | 1/2004 |
| CA | 2 498 136 | 3/2004 |
| CA | 2 522 396 | 11/2004 |
| CA | 2 443 206 | 3/2005 |
| CA | 2 472 671 | 12/2005 |
| CA | 2 567 076 | 1/2006 |
| CA | 2 526 782 | 4/2006 |
| CA | 2 541 531 | 7/2006 |
| CA | 2 550 102 | 4/2008 |
| CA | 2 773 699 | 10/2013 |
| CN | 1381032 | 11/2002 |
| CN | 1448908 | 10/2003 |
| CN | 1682267 A | 10/2005 |
| CN | 1760945 | 4/2006 |
| CN | 1886774 | 12/2006 |
| CN | 101315742 A | 12/2008 |
| CN | 101449311 | 6/2009 |
| CN | 101763838 A | 1/2010 |
| CN | 102656621 | 9/2012 |
| EP | 0 158 366 | 10/1985 |
| EP | 1 028 471 | 8/2000 |
| EP | 1 111 577 | 6/2001 |
| EP | 1 130 565 A1 | 9/2001 |
| EP | 1 194 013 | 4/2002 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 145 0341 A | 8/2004 |
| EP | 1 465 143 A | 10/2004 |
| EP | 1 469 448 A | 10/2004 |
| EP | 1 521 203 A2 | 4/2005 |
| EP | 1 594 347 | 11/2005 |
| EP | 1 784 055 A2 | 5/2007 |
| EP | 1854338 A1 | 11/2007 |
| EP | 1 879 169 A1 | 1/2008 |
| EP | 1 879 172 | 1/2008 |
| EP | 2395499 A1 | 12/2011 |
| GB | 2 389 951 | 12/2003 |
| JP | 1272298 | 10/1989 |
| JP | 4-042619 | 2/1992 |
| JP | 6-314977 | 11/1994 |
| JP | 8-340243 | 12/1996 |
| JP | 09-090405 | 4/1997 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000-056847 | 2/2000 |
| JP | 2000-81607 | 3/2000 |
| JP | 2001-134217 | 5/2001 |
| JP | 2001-195014 | 7/2001 |
| JP | 2002-055654 | 2/2002 |
| JP | 2002-91376 | 3/2002 |
| JP | 2002-514320 | 5/2002 |
| JP | 2002-229513 | 8/2002 |
| JP | 2002-278513 | 9/2002 |
| JP | 2002-333862 | 11/2002 |
| JP | 2003-076331 | 3/2003 |
| JP | 2003-124519 | 4/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-004675 | 1/2004 |
| JP | 2004-045648 | 2/2004 |
| JP | 2004-145197 | 5/2004 |
| JP | 2004-287345 | 10/2004 |
| JP | 2005-057217 | 3/2005 |
| JP | 2007-065015 | 3/2007 |
| JP | 2007-155754 | 6/2007 |
| JP | 2008-102335 | 5/2008 |
| JP | 4-158570 | 10/2008 |
| JP | 2003-195813 | 7/2013 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 1221268 | 9/2004 |
| TW | 1223092 | 11/2004 |
| TW | I248321 B | 1/2006 |
| TW | 200727247 | 7/2007 |
| WO | WO 1998/48403 | 10/1998 |
| WO | WO 1999/48079 | 9/1999 |
| WO | WO 2001/06484 | 1/2001 |
| WO | WO 2001/27910 A1 | 4/2001 |
| WO | WO 2001/63587 A2 | 8/2001 |
| WO | WO 2002/067327 A | 8/2002 |
| WO | WO 2003/001496 A1 | 1/2003 |
| WO | WO 2003/034389 A | 4/2003 |
| WO | WO 2003/058594 A1 | 7/2003 |
| WO | WO 2003/063124 | 7/2003 |
| WO | WO 2003/077231 | 9/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 | 8/2006 |
| WO | WO 2007/003877 A | 1/2007 |
| WO | WO 2007/079572 | 7/2007 |
| WO | WO 2007/120849 A2 | 10/2007 |
| WO | WO 2009/048618 | 4/2009 |
| WO | WO 2009/055920 | 5/2009 |
| WO | WO 2010/023270 | 3/2010 |
| WO | WO 2010/146707 A1 | 12/2010 |
| WO | WO 2011/041224 A1 | 4/2011 |
| WO | WO 2011/064761 A1 | 6/2011 |
| WO | WO 2011/067729 | 6/2011 |
| WO | WO 2012/160424 A1 | 11/2012 |
| WO | WO 2012/160471 | 11/2012 |
| WO | WO 2012/164474 A2 | 12/2012 |
| WO | WO 2012/164475 A2 | 12/2012 |

OTHER PUBLICATIONS

Alexander : "Pixel circuits and drive schemes for glass and elastic AMOLED displays"; dated Jul. 2005 (9 pages).

Alexander : "Unique Electrical Measurement Technology for Compensation, Inspection, and Process Diagnostics of AMOLED HDTV"; dated May 2010 (4 pages).

Ashtiani : "AMOLED Pixel Circuit With Electronic Compensation of Luminance Degradation"; dated Mar. 2007 (4 pages).

Chaji : "A Current-Mode Comparator for Digital Calibration of Amorphous Silicon AMOLED Displays"; dated Jul. 2008 (5 pages).

Chaji : "A fast settling current driver based on the CCII for AMOLED displays"; dated Dec. 2009 (6 pages).

Chaji : "A Low-Cost Stable Amorphous Silicon AMOLED Display with Full V~T- and V~O~L~E~D Shift Compensation"; dated May 2007 (4 pages).

Chaji : "A low-power driving scheme for a-Si:H active-matrix organic light-emitting diode displays"; dated Jun. 2005 (4 pages).

Chaji : "A low-power high-performance digital circuit for deep submicron technologies"; dated Jun. 2005 (4 pages).

Chaji : "A novel a-Si:H AMOLED pixel circuit based on short-term stress stability of a-Si:H TFTs"; dated Oct. 2005 (3 pages).

Chaji : "A Novel Driving Scheme and Pixel Circuit for AMOLED Displays"; dated Jun. 2006 (4 pages).

Chaji : "A Novel Driving Scheme for High Resolution Large-area a-Si:H AMOLED displays"; dated Aug. 2005 (3 pages).

(56) References Cited

OTHER PUBLICATIONS

Chaji : "A Stable Voltage-Programmed Pixel Circuit for a-Si:H AMOLED Displays"; dated Dec. 2006 (12 pages).
Chaji : "A Sub-µA fast-settling current-programmed pixel circuit for AMOLED displays"; dated Sep. 2007.
Chaji : "An Enhanced and Simplified Optical Feedback Pixel Circuit for AMOLED Displays"; dated Oct. 2006.
Chaji : "Compensation technique for DC and transient instability of thin film transistor circuits for large-area devices"; dated Aug. 2008.
Chaji : "Driving scheme for stable operation of 2-TFT a-Si AMOLED pixel"; dated Apr. 2005 (2 pages).
Chaji : "Dynamic-effect compensating technique for stable a-Si:H AMOLED displays"; dated Aug. 2005 (4 pages).
Chaji : "Electrical Compensation of OLED Luminance Degradation"; dated Dec. 2007.
Chaji : "eUTDSP: a design study of a new VLIW-based DSP architecture"; dated My 2003 (4 pages).
Chaji : "Fast and Offset-Leakage Insensitive Current-Mode Line Driver for Active Matrix Displays and Sensors"; dated Feb. 2009 (8 pages).
Chaji : "High Speed Low Power Adder Design With A New Logic Style: Pseudo Dynamic Logic (SDL)"; dated Oct. 2001 (4 pages).
Chaji : "High-precision, fast current source for large-area current-programmed a-Si flat panels"; dated Sep. 2006 (4 pages).
Chaji : "Low-Cost AMOLED Television with IGNIS Compensating Technology"; dated May 2008 (4 pages).
Chaji : "Low-Cost Stable a-Si:H AMOLED Display for Portable Applications"; dated Jun. 2006 (4 pages).
Chaji : "Low-Power Low-Cost Voltage-Programmed a-Si:H AMOLED Display"; dated Jun. 2008 (5 pages).
Chaji : "Merged phototransistor pixel with enhanced near infrared response and flicker noise reduction for biomolecular imaging"; dated Nov. 2008 (3 pages).
Chaji : "Parallel Addressing Scheme for Voltage-Programmed Active-Matrix OLED Displays"; dated May 2007 (6 pages).
Chaji : "Pseudo dynamic logic (SDL): a high-speed and low-power dynamic logic family"; dated 2002 (4 pages).
Chaji : "Stable a-Si:H circuits based on short-term stress stability of amorphous silicon thin film transistors"; dated May 2006 (4 pages).
Chaji : "Stable Pixel Circuit for Small-Area High- Resolution a-Si:H AMOLED Displays"; dated Oct. 2008 (6 pages).
Chaji : "Stable RGBW AMOLED display with Oled degradation compensation using electrical feedback"; dated Feb. 2010 (2 pages).
Chaji : "Thin-Film Transistor Integration for Biomedical Imaging and AMOLED Displays"; dated 2008 (177 pages).
European Search Report for Application No. EP 04 78 6661 dated Mar. 9, 2009.
European Search Report for Application No. EP 05 75 9141 dated Oct. 30, 2009 (2 pages).
European Search Report for Application No. EP 05 81 9617 dated Jan. 30, 2009.
European Search Report for Application No. EP 06 70 5133 dated Jul. 18, 2008.
European Search Report for Application No. EP 06 72 1798 dated Nov. 12, 2009 (2 pages).
European Search Report for Application No. EP 07 71 0608.6 dated Mar. 19, 2010 (7 paegs).
European Search Report for Application No. EP 07 71 9579 dated May 20, 2009.
European Search Report for Application No. EP 07 81 5784 dated Jul. 20, 2010 (2 pages).
European Search Report for Application No. EP 10 16 6143, dated Sep. 3, 2010 (2 pages).
European Search Report for Application No. EP 10 83 4294.0-1903, dated Apr. 8, 2013, (9 pages).
European Supplementary Search Report for Application No. EP 04 78 6662 dated Jan. 19, 2007 (2 pages).
Extended European Search Report for Application No. 11 73 9485.8 dated Aug. 6, 2013 (14 pages).
Extended European Search Report for Application No. EP 09 73 3076.5, dated Apr. 27, (13 pages).
Extended European Search Report for Application No. EP 11 16 8677.0, dated Nov. 29, 2012, (13 page).
Extended European Search Report for Application No. EP 11 19 1641.7 dated Jul. 11, 2012 (14 pages).
Extended European Search Report for Application No. EP 10834297 dated Oct. 27, 2014 (6 pages).
Fossum, Eric R.. "Active Pixel Sensors: Are CCD's Dinosaurs?" SPIE: Symposium on Electronic Imaging. Feb. 1, 1993 (13 pages).
Goh , "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
International Preliminary Report on Patentability for Application No. PCT/CA2005/001007 dated Oct. 16, 2006, 4 pages.
International Search Report for Application No. PCT/CA2004/001741 dated Feb. 21, 2005.
International Search Report for Application No. PCT/CA2004/001742, Canadian Patent Office, dated Feb. 21, 2005 (2 pages).
International Search Report for Application No. PCT/CA2005/001007 dated Oct. 18, 2005.
International Search Report for Application No. PCT/CA2005/001897, dated Mar. 21, 2006 (2 pages).
International Search Report for Application No. PCT/CA2007/000652 dated Jul. 25, 2007.
International Search Report for Application No. PCT/CA2009/000501, dated Jul. 30, 2009 (4 pages).
International Search Report for Application No. PCT/CA2009/001769, dated Apr. 8, 2010 (3 pages).
International Search Report for Application No. PCT/IB2010/055481, dated Apr. 7, 2011, 3 pages.
International Search Report for Application No. PCT/IB2010/055486, dated Apr. 19, 2011, 5 pages.
International Search Report for Application No. PCT/IB2014/060959, dated Aug. 28, 2014, 5 pages.
International Search Report for Application No. PCT/IB2010/055541 filed Dec. 1, 2010, dated May 26, 2011; 5 pages.
International Search Report for Application No. PCT/IB2011/050502, dated Jun. 27, 2011 (6 pages).
International Search Report for Application No. PCT/IB2011/051103, dated Jul. 8, 2011, 3 pages.
International Search Report for Application No. PCT/IB2011/055135, Canadian Patent Office, dated Apr. 16, 2012 (5 pages).
International Search Report for Application No. PCT/IB2012/052372, dated Sep. 12, 2012 (3 pages).
International Search Report for Application No. PCT/IB2013/054251, Canadian Intellectual Property Office, dated Sep. 11, 2013; (4 pages).
International Search Report for Application No. PCT/JP02/09668, dated Dec. 3, 2002, (4 pages).
International Written Opinion for Application No. PCT/CA2004/001742, Canadian Patent Office, dated Feb. 21, 2005 (5 pages).
International Written Opinion for Application No. PCT/CA2005/001897, dated Mar. 21, 2006 (4 pages).
International Written Opinion for Application No. PCT/CA2009/000501 dated Jul. 30, 2009 (6 pages).
International Written Opinion for Application No. PCT/IB2010/055481, dated Apr. 7, 2011, 6 pages.
International Written Opinion for Application No. PCT/IB2010/055486, dated Apr. 19, 2011, 8 pages.
International Written Opinion for Application No. PCT/IB2010/055541, dated May 26, 2011; 6 pages.
International Written Opinion for Application No. PCT/IB2011/050502, dated Jun. 27, 2011 (7 pages).
International Written Opinion for Application No. PCT/IB2011/051103, dated Jul. 8, 2011, 6 pages.
International Written Opinion for Application No. PCT/IB2011/055135, Canadian Patent Office, dated Apr. 16, 2012 (5 pages).
International Written Opinion for Application No. PCT/IB2012/052372, dated Sep. 12, 2012 (6 pages).
International Written Opinion for Application No. PCT/IB2013/054251, Canadian Intellectual Property Office, dated Sep. 11, 2013; (5 pages).

(56) References Cited

OTHER PUBLICATIONS

Jafarabadiashtiani : "A New Driving Method for a-Si AMOLED Displays Based on Voltage Feedback"; dated 2005 (4 pages).
Kanicki, J., "Amorphous Silicon Thin-Film Transistors Based Active-Matrix Organic Light-Emitting Displays." Asia Display: International Display Workshops, Sep. 2001 (pp. 315-318).
Karim, K. S., "Amorphous Silicon Active Pixel Sensor Readout Circuit for Digital Imaging." IEEE: Transactions on Electron Devices. vol. 50, No. 1, Jan. 2003 (pp. 200-208).
Lee : "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages).
Liu, P. et al., Innovative Voltage Driving Pixel Circuit Using Organic Thin-Film Transistor for AMOLEDs, Journal of Display Technology, vol. 5, Issue 6, Jun. 2009 (pp. 224-227).
Ma E Y: "organic light emitting diode/thin film transistor integration for foldable displays" dated Sep. 15, 1997(4 pages).
Matsueda y : "35.1: 2.5-in. AMOLED with Integrated 6-bit Gamma Compensated Digital Data Driver"; dated May 2004.
Mendes E., "A High Resolution Switch-Current Memory Base Cell." IEEE: Circuits and Systems. vol. 2, Aug. 1999 (pp. 718-721).
Nathan A. , "Thin Film imaging technology on glass and plastic" ICM 2000, proceedings of the 12 international conference on microelectronics, dated Oct. 31, 2001 (4 pages).
Nathan , "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan : "Backplane Requirements for active Matrix Organic Light Emitting Diode Displays,"; dated 2006 (16 pages).
Nathan : "Call for papers second international workshop on compact thin-film transistor (TFT) modeling for circuit simulation"; dated Sep. 2009 (1 page).
Nathan : "Driving schemes for a-Si and LTPS AMOLED displays"; dated Dec. 2005 (11 pages).
Nathan : "Invited Paper: a-Si for AMOLED—Meeting the Performance and Cost Demands Of Display Applications (Cell Phone to HDTV)"; dated 2006 (4 pages).
Office Action in Japanese patent application No. JP2012-541612 dated Jul. 15, 2014. (3 pages).
Partial European Search Report for Application No. EP 11 168 677.0, dated Sep. 22, 2011 (5 pages).
Partial European Search Report for Application No. EP 11 19 1641.7, dated Mar. 20, 2012 (8 pages).
Philipp: "Charge transfer sensing" Sensor Review, vol. 19, No. 2, Dec. 31, 1999 (Dec. 31, 1999), 10 pages.
Rafati : "Comparison of a 17 b multiplier in Dual-rail domino and in Dual-rail D L (D L) logic styles"; dated 2002 (4 pages).
Safavian : "3-TFT active pixel sensor with correlated double sampling readout circuit for real-time medical x-ray imaging"; dated Jun. 2006 (4 pages).
Safavian : "A novel current scaling active pixel sensor with correlated double sampling readout circuit for real time medical x-ray imaging"; dated May 2007 (7 pages).
Safavian : "A novel hybrid active-passive pixel with correlated double sampling CMOS readout circuit for medical x-ray imaging"; dated May 2008 (4 pages).
Safavian : "Self-compensated a-Si:H detector with current-mode readout circuit for digital X-ray fluoroscopy"; dated Aug. 2005 (4 pages).
Safavian : "TFT active image sensor with current-mode readout circuit for digital x-ray fluoroscopy [5969D-82]"; dated Sep. 2005 (9 pages).
Safavian : "Three-TFT image sensor for real-time digital X-ray imaging"; dated Feb. 2, 2006 (2 pages).
Singh, "Current Conveyor: Novel Universal Active Block", Samriddhi, S-JPSET vol. I, Issue 1, 2010, pp. 41-48 (12EPPT).
Smith, Lindsay I., "A tutorial on Principal Components Analysis," dated Feb. 26, 2001 (27 pages).
Spindler , System Considerations for RGBW OLED Displays, Journal of the SID 14/1, 2006, pp. 37-48.
Stewart M. , "polysilicon TFT technology for active matrix oled displays" IEEE transactions on electron devices, vol. 48, No. 5, dated May 2001 (7 pages).
Vygranenko : "Stability of indium-oxide thin-film transistors by reactive ion beam assisted deposition"; dated 2009.
Wang : "Indium oxides by reactive ion beam assisted evaporation: From material study to device application"; dated Mar. 2009 (6 pages).
Yi He , "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
International Search Report for Application No. PCT/IB2014/058244, Canadian Intellectual Property Office, dated Apr. 11, 2014; (6 pages).
International Search Report for Application No. PCT/IB2014/059753, Canadian Intellectual Property Office, dated Jun. 23, 2014; (6 pages).
Written Opinion for Application No. PCT/IB2014/059753, Canadian Intellectual Property Office, dated Jun. 12, 2014 (6 pages).
International Search Report for Application No. PCT/IB2014/060879, Canadian Intellectual Property Office, dated Jul. 17, 2014 (3 pages).
Extended European Search Report for Application No. EP 14158051.4, dated Jul. 29, 2014, (4 pages).
Office Action in Chinese Patent Invention No. 201180008188.9, dated Jun. 4, 2014 (17 pages) (w/English translation).
International Search Report for Application No. PCT/IB/2014/066932 dated Mar. 24, 2015.
Written Opinion for Application No. PCT/IB/2014/066932 dated Mar. 24, 2015.
Extended European Search Report for Application No. EP 11866291.5, dated Mar. 9, 2015, (9 pages).
Extended European Search Report for Application No. EP 14181848.4, dated Mar. 5, 2015, (8 pages).
Office Action in Chinese Patent Invention No. 201280022957.5, dated Jun. 26, 2015 (7 pages).
Extended European Search Report for Application No. EP 13794695.0, dated Dec. 18, 2015, (9 pages).
Extended European Search Report for Application No. EP 16157746.5, dated Apr. 8, 2016, (11 pages).
Extended European Search Report for Application No. EP 16192749.6 dated Dec. 15, 2016 (17 pages).
International Search Report for Application No. PCT/IB/2016/054763 dated Nov. 25, 2016 (4 pages).
Written Opinion for Application No. PCT/IB/2016/054763 dated Nov. 25, 2016 (9 pages).
Extended European Search Report for Application No. EP 17195377.1 dated Feb. 12, 2018 (8 pages).
Extended European Search Report for Application No. EP 18150300.4 dated Mar. 14, 2018 (11 pages).
Jafarabadiashtiani, S ; "Pixel Circuits and Driving Schemes for Active-Matrix Organic 2007 University of Waterloo, Electrical and Computer Light-Emitting Diode Displays"; Engineering (188 pages).

* cited by examiner

SYSTEM AND METHODS FOR THERMAL COMPENSATION IN AMOLED DISPLAYS

CROSS-REFERENCE TO RELATED APPLICATIONS

This application is a continuation of U.S. patent application Ser. No. 15/289,138, filed Oct. 8, 2016, now allowed, which is a continuation of U.S. patent application Ser. No. 14/481,520, filed Sep. 9, 2014, now U.S. Pat. No. 9,489,897, which is a continuation of U.S. patent application Ser. No. 12/958,655, filed Dec. 2, 2010, now U.S. Pat. No. 8,907,991, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to active matrix organic light emitting device (AMOLED) displays, and particularly determining thermal conditions of the pixels of such displays.

BACKGROUND

Currently, active matrix organic light emitting device ("AMOLED") displays are being introduced. The advantages of such displays include lower power consumption, manufacturing flexibility and faster refresh rate over conventional liquid crystal displays. In contrast to conventional liquid crystal displays, there is no backlighting in an AMOLED display as each pixel consists of different colored OLEDs emitting light independently. The OLEDs emit light based on current supplied through a drive transistor. The power consumed in each pixel has a direct relation with the magnitude of the generated light in that pixel. As a result, the uneven power consumption profile, the anisotropic lateral heat conduction of the panel (e.g. lower conduction in the panel edges), and the differential heat convection in vertical orientation lead to a highly non-uniform surface temperature profile.

The non-uniformity of the temperature severely impacts the quality of the display by adding visual spatio-temporal artifacts. That is due to the strong thermo-electrical-optical coupling in the characteristics of the pixel circuits, such as the thermal dependency of the voltage-current characteristic of the thin film transistors (TFTs) that are used as drive transistors and their short-time threshold voltage aging rate. The drive-in current of the TFT determines the pixel's OLED luminance. Since the pixel circuits are voltage programmable, the spatial-temporal thermal profile of the display surface changing the voltage-current characteristic of the drive transistor impacts the quality of the display. The rate of the short-time aging of the thin film transistor devices is also temperature dependent. If the temperature of each pixel is known, proper corrections can be applied to the video stream in order to compensate for the unwanted thermal-driven visual effects.

However, determining the temperature of each pixel presents difficulties in the need for additional components such as thermal sensors and/or additional computational circuitry to analyze the performance of each pixel during the use of the display. Accurate yet efficient real-time extraction of surface thermal profiles is therefore needed. Such information is critical to provide proper compensation for the thermal effects in large area AMOLED displays.

SUMMARY

Aspects of the present disclosure include a current-biased, voltage-programmed display panel allowing measurement of temperature. The panel includes a plurality of pixels each including a drive transistor and an organic light emitting device coupled to the drive transistor. A controller is coupled to each of the plurality of pixels. The controller causes a programming voltage to be applied to the gate of the respective drive transistors to control the brightness of each pixel. The controller further reads data from selected ones of the plurality of pixels to determine the temperature of the selected ones of the plurality of pixels. The controller estimates the temperature of the other non-selected plurality of pixels based on the determined temperature of the selected ones of the plurality of pixels.

Another aspect of the present disclosure is a method of determining the temperature profile of an active matrix organic light emitting device display including a plurality of organic light emitting device pixels. Each pixel has a programming voltage input to determine brightness. The temperature of selected ones of the plurality of pixels is determined. The selected pixels are less than all of the plurality of pixels. The temperature of the rest of the non-selected plurality of pixels is estimated using the determined temperature of the selected ones of the plurality of pixels.

Another aspect of the present disclosure is a non-transitory machine readable medium having stored thereon instructions for determining a temperature profile of an active matrix organic light emitting device display including a plurality of organic light emitting device pixels. Each pixel has a programming voltage input to determine brightness. The instructions include machine executable code which when executed by at least one machine, causes the machine to determine the temperature of selected ones of the plurality of pixels, the selected ones being less than all of the plurality of pixels. The instructions also cause the machine to estimate the temperature of the rest of the non-selected plurality of pixels using the determined temperature of the selected ones of the plurality of pixels.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
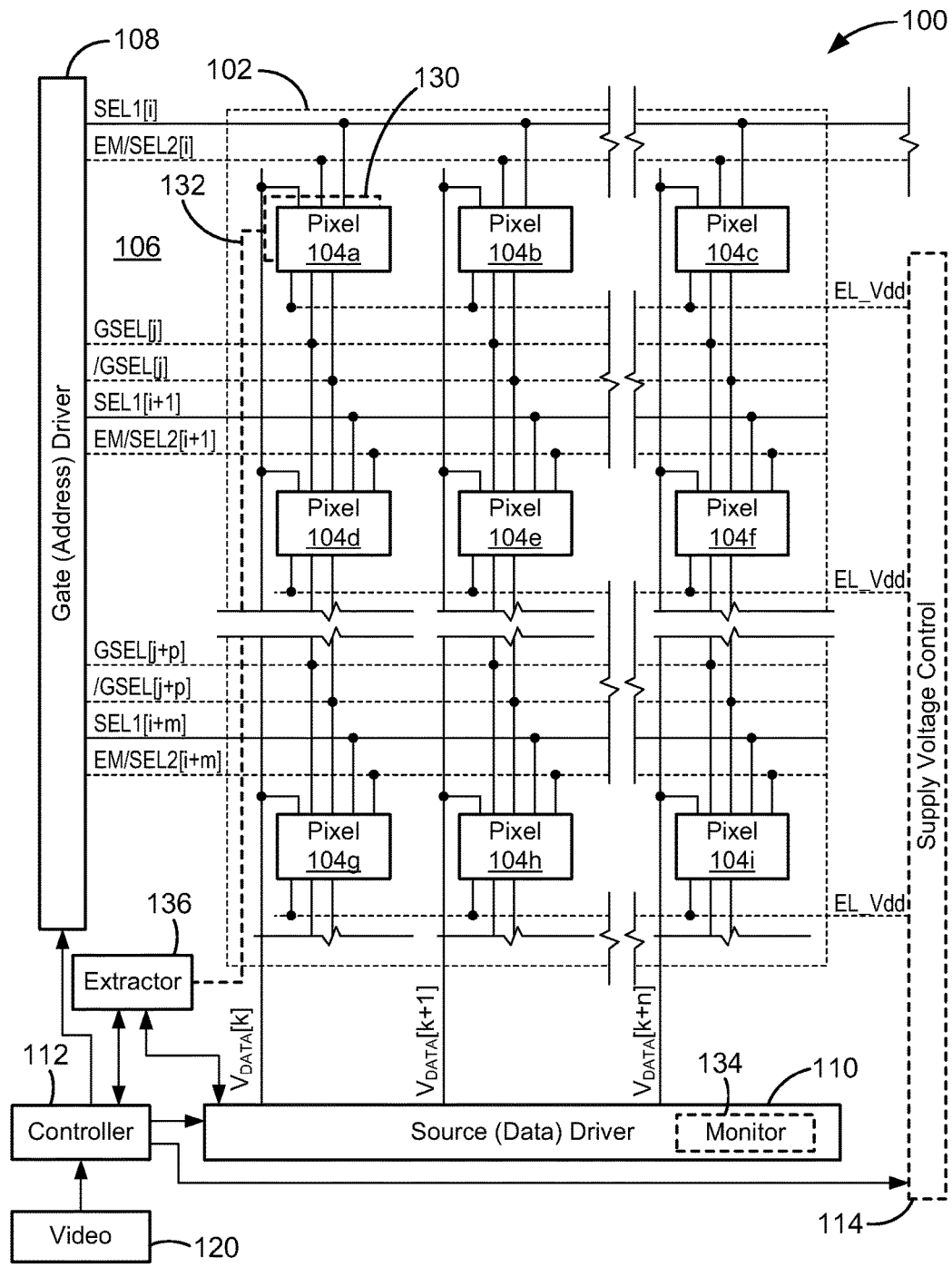
FIG. 1 is a block diagram of a AMOLED display with temperature compensation control.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is an electronic display system 100 having an active matrix area or pixel array 102 in which an array of pixels 104a-d are arranged in a row and column configuration. For ease of illustration, only two rows and columns are shown. External to the active matrix area 102 is a peripheral area 106 where peripheral circuitry for driving and controlling the pixel area 102 are disposed. The peripheral circuitry includes a gate or address driver circuit 108, a source or data driver circuit 110, a controller 112, and an optional supply voltage (e.g., Vdd) driver 114. The controller 112 controls the gate, source, and supply voltage drivers 108, 110, 114. The gate driver 108, under control of the controller 112, operates on address or select lines SEL[i], SEL[i+1], and so forth, one for each row of pixels 104a-i in the pixel array 102. In pixel sharing configurations described below, the gate or address driver circuit 108 can also optionally operate on global select lines GSEL[j] and optionally/GSEL[j], which operate on multiple rows of pixels 104a-i in the pixel array 102, such as every two rows of pixels 104a-d. The source driver circuit 110, under control of the controller 112, operates on voltage data lines Vdata[k], Vdata[k+1], and so forth, one for each column of pixels 104a-i in the pixel array 102. The voltage data lines carry voltage programming information to each pixel 104a-i indicative of brightness of each light emitting device in the pixels 104a-i. A storage element, such as a capacitor, in each pixel 104a-i stores the voltage programming information until an emission or driving cycle turns on the light emitting device. The optional supply voltage driver 114, under control of the controller 112, controls a supply voltage (EL_Vdd) line, one for each row of pixels 104a-i in the pixel array 102.

The display system 100 may also include a current source circuit, which supplies a fixed current on current bias lines. In some configurations, a reference current can be supplied to the current source circuit. In such configurations, a current source control controls the timing of the application of a bias current on the current bias lines. In configurations in which the reference current is not supplied to the current source circuit, a current source address driver controls the timing of the application of a bias current on the current bias lines.

As is known, each pixel 104a-i in the display system 100 needs to be programmed with information indicating the brightness of the light emitting device in the pixel 104a-i. A frame defines the time period that includes a programming cycle or phase during which each and every pixel in the display system 100 is programmed with a programming voltage indicative of a brightness and a driving or emission cycle or phase during which each light emitting device in each pixel is turned on to emit light at a brightness commensurate with the programming voltage stored in a storage element. A frame is thus one of many still images that compose a complete moving picture displayed on the display system 100. There are at least two schemes for programming and driving the pixels: row-by-row, or frame-by-frame. In row-by-row programming, a row of pixels is programmed and then driven before the next row of pixels is programmed and driven. In frame-by-frame programming, all rows of pixels in the display system 100 are programmed first, and all of the pixels are driven row-by-row. Either scheme can employ a brief vertical blanking time at the beginning or end of each frame during which the pixels are neither programmed nor driven.

The components located outside of the pixel array 102 may be disposed in a peripheral area 106 around the pixel array 102 on the same physical substrate on which the pixel array 102 is disposed. These components include the gate driver 108, the source driver 110 and the optional supply voltage control 114. Alternately, some of the components in the peripheral area can be disposed on the same substrate as the pixel array 102 while other components are disposed on a different substrate, or all of the components in the peripheral area can be disposed on a substrate different from the substrate on which the pixel array 102 is disposed. Together, the gate driver 108, the source driver 110, and the supply voltage control 114 make up a display driver circuit. The display driver circuit in some configurations may include the gate driver 108 and the source driver 110 but not the supply voltage control 114.

In order to facilitate temperature compensation, two general methodologies may be used for the real-time and efficient extraction of the surface temperature profile of the AMOLED display system 100 in FIG. 1 for temperature compensation purposes. One method may extract the full temperature through the use of temperature data. The temperature data may be obtained from various voltage or current measurements or from limited thermal sensors on the AMOLED display system 100. Another method calculates the thermal profile from the video data from the AMOLED display system 100. This method relies on cutting the computational cost significantly with minimal estimation error via selection of limited pixels for temperature measurement. The methods may be performed by the controller 112 in FIG. 1, but other hardware and/or software may perform these methods such as a video processor or a digital signal processor on a device coupled to the display system 100.

FIG. 1 therefore shows the use of limited thermal sensors such as a thermal sensor 130 on a selected pixel 104a of the AMOLED display system 100. The thermal sensor 130 may be integrated on the pixel array 102 or there may be a separate substrate containing a matrix of the thermal sensor components. FIG. 1 shows the optional thermal sensor 130 corresponding to only one of a group of pixels such as the pixel 104a in the pixel array 102. The thermal sensor 130 is coupled to a monitor line 132 that is coupled to the controller 112. Other surrounding pixels such as the pixels 104*b-i* do not have a thermal sensor. Thus, there are many fewer thermal sensors 130 than pixels 104*a-i*. For example, all the pixels 104 may be divided into 5 by 5 segments and therefore for each 25 pixels, a single thermal sensor 130 is provided such as for the pixel 104*a*.

Figure 2:
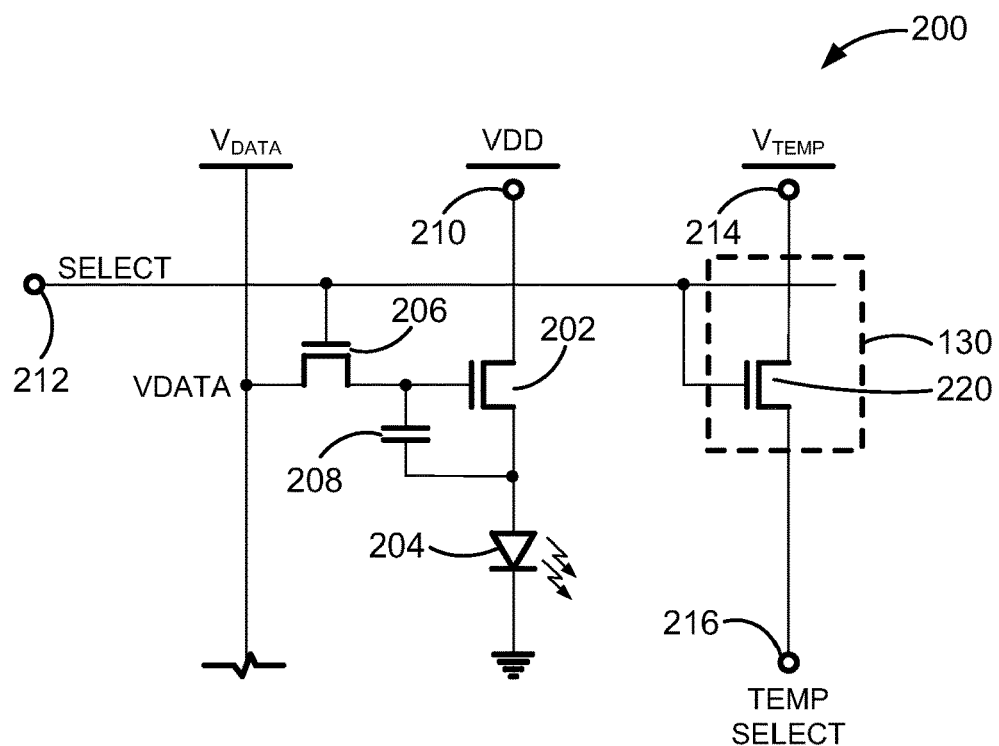
FIG. 2 is a circuit diagram of a drive circuit including a thermal sensor for a selected one of the pixels in the AMOLED display in FIG. 1.

FIG. 2 shows a driver circuit 200 for the thermal sensor 130 that is integrated in the driver circuit 200 for the pixel 104*a* in FIG. 1. The driver circuit 200 includes a drive transistor 202, an organic light emitting device ("OLED") 204, a select transistor 206 and a source capacitor 208. A voltage source 210 is coupled to the drive transistor 206. A select line 212 is coupled to the select transistor 206. The driver circuit 200 includes a monitor line 214 that is coupled to the drain of a thermal transistor 220 which is part of the thermal sensor 130. The thermal transistor 220 has a source that is coupled to a temperature select line 216. The current through the thermal transistor 220 is a function of the temperature of the pixel 104*a*. During the readout time, the select line 212 is pulled high which may be in parallel with the pixel programming cycle. The temperature select line 216 will be pulled low and therefore the monitor line 214 will provide access to the current of the transistor 220. Since the current of the transistor 220 will change based on temperature, temperature information may be extracted from this current. Thus, the temperatures of certain pixels in the pixel array 102 such as the pixel 104*a* are measured by activating the monitor line 214 via the select line 212.

Another method of determining the temperature of selected pixels is by measuring change in output voltage at different points in time which represents temperature of the pixel. Such data may be obtained by monitoring the change in pixel output voltage data such as by methods for detecting shifts in performance due to aging described in application Ser. No. 11/673,512 filed Feb. 9, 2007 (Publication No. 2007/0195020) hereby incorporated by reference. Monitoring a display for the effects of aging requires sampling data from the pixels at a slow rate such as every few frames. However, such data may also be used for thermal measurements based on changes in output voltage from selected pixels during the blanking intervals of each frame.

The temperature of a pixel may be determined based on output voltages measured on a driver circuit such as the data driver 110 that shown in FIG. 1 without the thermal sensor 130 in FIGS. 1 and 2 based on a calibration voltage applied to the gate of the drive transistor of selected pixels such as the pixel 104*a* during a blank frame or the blanking intervals of each frame. In this example, the data driver 110 has an optional monitor 134 for driving and monitoring the output voltage as shown in FIG. 1. An optional extractor block 136 calculates the temperatures of the selected pixels based on the voltage generated on the output voltage from an output voltage line 138. The data signals to the pixels 104*a-i* are calibrated for temperature based on the monitoring result (i.e., the change in output voltage). The monitoring result may be provided to the controller 112. The supply voltage may be used by the controller 112 to drive the current for the OLED which in turn represents the temperature of the pixel 104.

Figure 3:
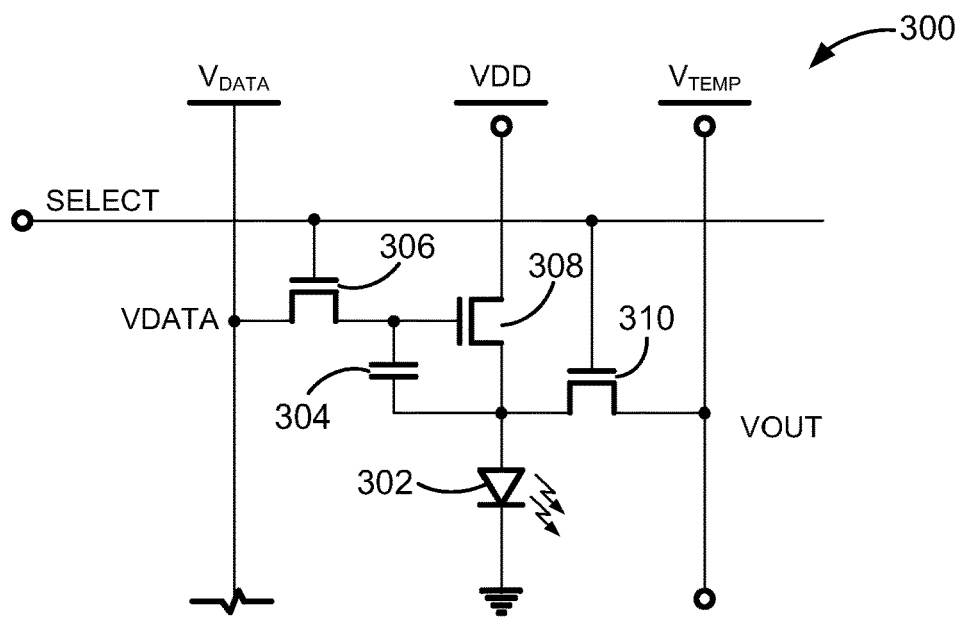
FIG. 3 is a circuit diagram for an alternate drive circuit that allows sensing of voltage data from a selected pixel to determine pixel temperature in the AMOLED display in FIG. 1.

FIG. 3 shows an example of a driver circuit 300 that may be used for selected pixels such as the pixel 104*a* to determine temperature from separate voltage measurements eliminating the need for a dedicated thermal sensor. The driver circuit 300 in FIG. 3 includes an OLED 302, a storage capacitor 304, a switch transistor 306, and a drive transistor 308.

The drain terminal of the drive transistor 308 is connected to a power supply line VDD from the voltage drive 114 in FIG. 1, and the source terminal of the drive transistor 308 is connected to the OLED 302. The switch transistor 306 is connected between a data line VDATA and the gate terminal of the drive transistor 308. One terminal of the storage capacitor 304 is connected to the gate terminal of the drive transistor 308, and the other terminal of the storage capacitor 304 is connected to the source terminal of the drive transistor 308 and the OLED 302.

A sensing transistor 310 connects the source terminal of the drive transistor 308 and the OLED 302 to the output line (VOUT) 138 which is coupled to the data driver 110 in FIG. 1. The gate terminal of the sensing transistor 310 is connected to the select line input SEL that is controlled by the gate driver 108 in FIG. 1. The effect of temperature on the driver circuit 300 is extracted by monitoring the voltage of the output line 138. The select line input SEL is shared by the switch transistor 306 and the sensing transistor 310. The measurement of the temperature may occur during a blank frame where the gate terminal of the drive transistor 308 is charged to a calibration voltage (VCG) via the data line input. The calibration voltage (VCG) includes the temperature prediction, calculated based on the previous temperature data. During the extraction cycle, the drive transistor 308 acts as an amplifier since it is biased with a constant current through the output voltage (VOUT). The voltage developed on the output voltage (VOUT) as a result of current (Ic) applied to it is ($V_{CD}+\Delta V_{CD}$). Therefore, the effects of temperature on the pixel are amplified, and change of the voltage of the output voltage is a function of the temperature. This enables extraction of very small amount of voltage threshold (VT) shift resulting in highly accurate indication of the temperature of the pixel. The change in the output voltage, VOUT, is monitored. Then, the change(s) in the voltage output, VOUT, is used for determining the temperature of the pixel and thus the calibration of the programming voltage to compensate for the temperature.

The normal operation of the driver circuit 300 includes a programming cycle and a driving cycle. During the programming cycle, the gate terminal of the drive transistor 308 is charged to a calibrated programming voltage using the monitoring result (i.e., the changes of VOUT due to temperature). The charge is held by the charging capacitor 304 and during the driving cycle, the select line SEL is low and the drive transistor 308 provides current to the OLED 302. This operation occurs for all of the driver circuits for the pixels of the pixel array 102. The calibrated programming voltage is determined using the temperature for the selected pixels such as the pixel 104*a* and an estimated temperature for the non-selected pixels such as pixels 104*b-i* in the array 102.

Figure 4:
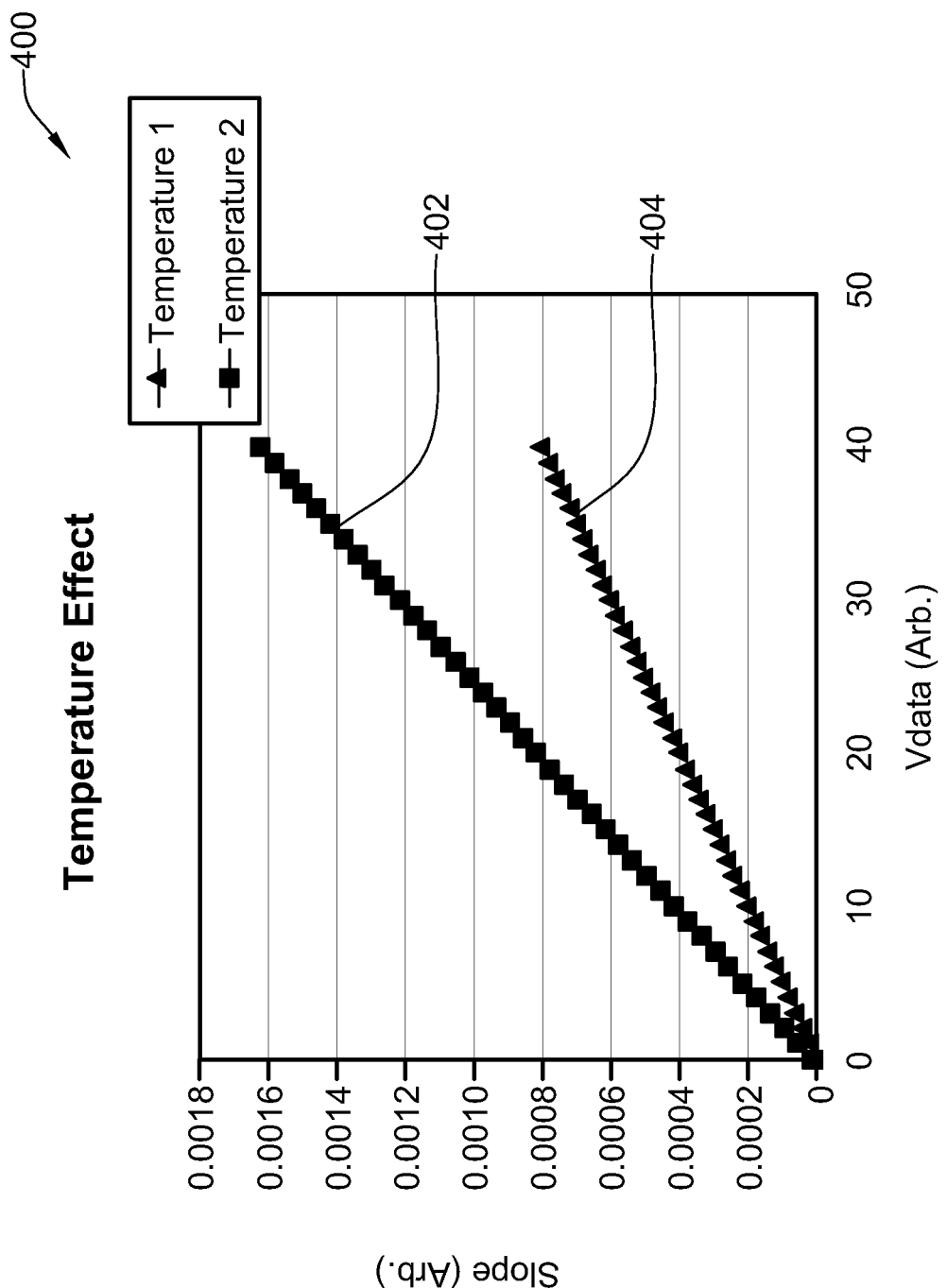
FIG. 4 is a graph showing the effects of temperature on the slope of OLED current over change in programming voltage to the gate of the drive transistor.

FIG. 4 is a graph 400 of the effects the slope of the current of the drive transistor 308 versus the programming voltage level to the data line input VDATA in FIG. 3. The graph 400 includes a first current slope 402 at a first temperature and a second current slope 404 at a second temperature. The slope of the current of the drive transistor 308 is therefore used by the monitor 134 in FIG. 1 to determine the temperature of the pixel. As shown in FIG. 4, temperature affects the performance of the drive transistor 308 significantly by varying the current produced by different levels of programming voltages. Thus, the slope of the IV characteristics of the drive transistor 308 changes by temperature and therefore measuring the output voltage at two points to determine the current at the two points will determine the change. The slope of the current is calculated by $(I_1-I_2)/(V_{data1}-V_{data2})$ where the $I_1$ and $I_2$ are the current of the drive transistor 308 related to programming voltage ($V_{data1}$)

at a first point in time and programming voltage ($V_{data2}$) at a second point in time respectively. Thus, any change in the slope can be associated to a particular temperature on the pixel as shown by the different slopes 402 and 404 in FIG. 4.

Once the temperatures of the selected pixels, such as the pixel 104a, are determined whether by a thermal sensor or through measuring the output voltages as described above, the temperature of the remaining non-selected pixels in the array 102 around each of the selected pixels may be interpolated using a number of different techniques including nearest neighbor, bilinear, bicubic or Kriging.

Figure 5A:
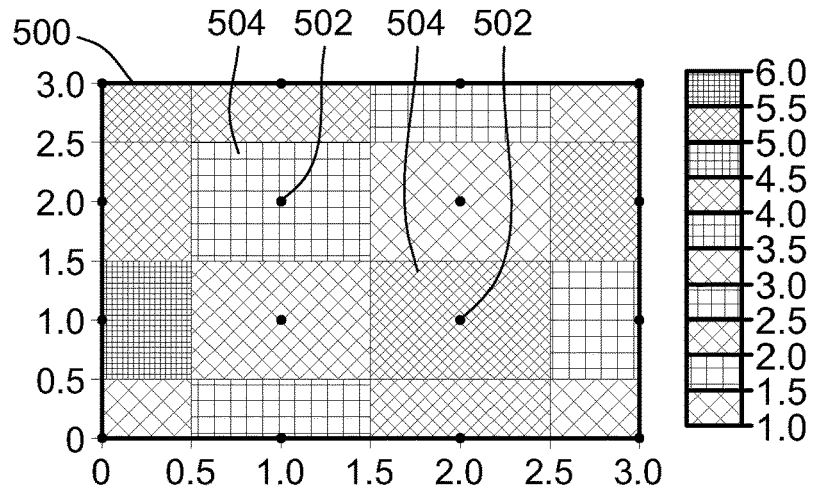
FIG. 5A-5C are thermal graphs of the allocation of temperature on the AMOLED display in FIG. 1 using different interpolation methods.

The nearest neighbor interpolation method sets the temperature of all of the neighboring pixels around the selected pixels to the same temperature measured by the pixel. FIG. 5A is a graph 500 showing the temperature determined by the nearest neighbor method. The shades in FIG. 5A represent different temperatures assigned based on the selected pixel temperature. The selected pixels 502 produce temperature measurements either through a temperature sensor or via calculation from output voltages. The temperatures of the neighboring pixels in the surrounding area 504 of the selected pixels 502 are set to the same temperature as the selected pixel 502. This method is computationally simple, but not as accurate as more complex methods of interpolation.

Another method is bilinear interpolation where the temperature of the pixels are determined by linear interpolation in both x and y directions from the selected pixel. Therefore, the interpolation is continuous, as shown by the equation below.

$$T(x, y) = \binom{T(x_i, y_i)(x_{i+1} - x)(y_{i+1} - y) + T(x_{i+1}, y_i)(x - x_i)(y_{i+1} - y) +}{T(x_i, y_{i+1})(x_{i+1} - x)(y - y_i) + T(x_{i+1}, y_{i+1})(x - x_i)(y - y_i)} \Big/$$

$$((x_{i+1} - x_i)(y_{i+1} - y_i))$$

Figure 5B:
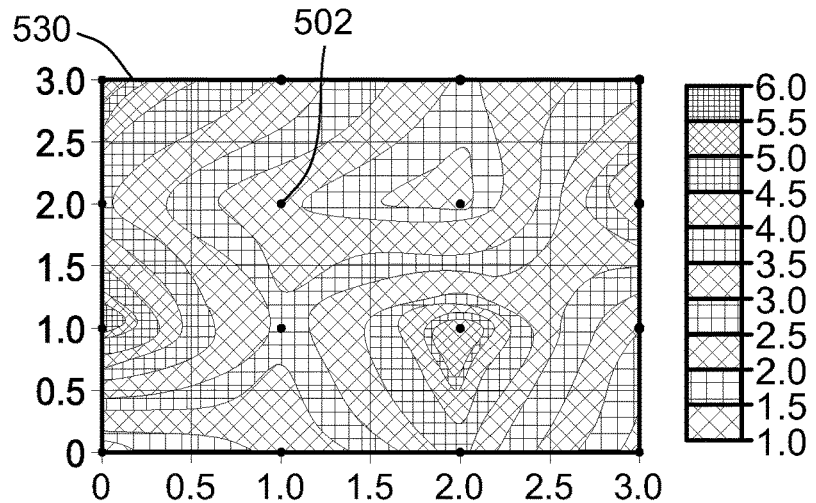

T (i, j) is the closest temperature measurement to the left-bottom of the pixel location (x,y). FIG. 5B shows a temperature graph that shows the resulting temperatures assigned to the pixels in the array based on the temperature data using bilinear interpolation from the temperature of the selected pixels. The selected pixels 502 result in a more accurate temperature distribution than the near neighbor method.

Figure 5C:
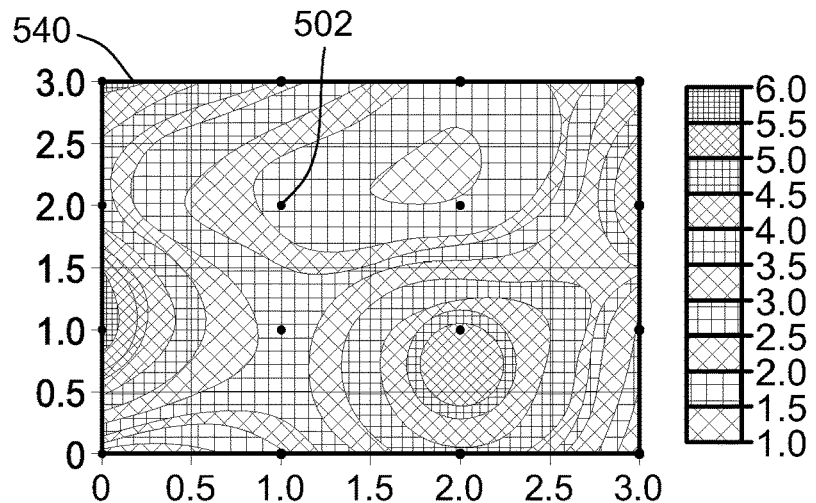

Another method is bicubic interpolation which results in smoother transitions than bilinear interpolation. The bicubic interpolation uses four corners around the selected pixel and their first order derivatives. The bicubic interpolation is up to first derivative continuous as shown in FIG. 5C which shows the estimated temperatures on pixels around the selected pixels 502.

The bicubic interpolation follows the equation $$T(x, y) = \sum_{m=0}^{3} \sum_{n=0}^{3} a_{mn}(x - x_i)^m (y - y_j)^n$$

Where $$\begin{bmatrix} a_{00} \\ a_{10} \\ a_{20} \\ a_{30} \\ a_{01} \\ a_{11} \\ a_{21} \\ a_{31} \\ a_{02} \\ a_{12} \\ a_{22} \\ a_{32} \\ a_{03} \\ a_{13} \\ a_{23} \\ a_{33} \end{bmatrix} = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ -3 & 3 & 0 & 0 & -2 & -1 & 0 & 0 & 0 & 0 & 0 & 0 & 0 & 0 & 0 & 0 \\ 2 & -2 & 0 & 0 & 1 & 1 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & -3 & 3 & 0 & 0 & -2 & -1 & 0 & 0 \\ 0 & 0 & 0 & 0 & 0 & 0 & 0 & 0 & 2 & -2 & 0 & 0 & 1 & 1 & 0 & 0 \\ -3 & 0 & 3 & 0 & 0 & 0 & 0 & 0 & -2 & 0 & -1 & 0 & 0 & 0 & 0 & 0 \\ 0 & 0 & 0 & 0 & -3 & 0 & 3 & 0 & 0 & 0 & 0 & 0 & -2 & 0 & -1 & 0 \\ 9 & -9 & -9 & 9 & 6 & 3 & -6 & -3 & 6 & -6 & 3 & -3 & 4 & 2 & 2 & 1 \\ -6 & 6 & 6 & -6 & -3 & -3 & 3 & 3 & -4 & 4 & -2 & 2 & -2 & -2 & -1 & -1 \\ 2 & 0 & -2 & 0 & 0 & 0 & 0 & 0 & 1 & 0 & 1 & 0 & 0 & 0 & 0 & 0 \\ 0 & 0 & 0 & 0 & 2 & 0 & -2 & 0 & 0 & 0 & 0 & 0 & 1 & 0 & 1 & 0 \\ -6 & 6 & 6 & -6 & -4 & -2 & 4 & 2 & -3 & 3 & -3 & 3 & -2 & -1 & -2 & -1 \\ 4 & -4 & -4 & 4 & 2 & 2 & -2 & -2 & 2 & -2 & 2 & -2 & 1 & 1 & 1 & 1 \end{bmatrix} \times \begin{bmatrix} T(x_i, y_i) \\ T(x_{i+1}, y_i) \\ T(x_i, y_{i+1}) \\ T(x_{i+1}, y_{i+1}) \\ T_x(x_i, y_i) \\ T_x(x_{i+1}, y_i) \\ T_x(x_i, y_{i+1}) \\ T_x(x_{i+1}, y_{i+1}) \\ T_y(x_i, y_i) \\ T_y(x_{i+1}, y_i) \\ T_y(x_i, y_{i+1}) \\ T_y(x_{i+1}, y_{i+1}) \\ T_{xy}(x_i, y_i) \\ T_{xy}(x_{i+1}, y_i) \\ T_{xy}(x_i, y_{i+1}) \\ T_{xy}(x_{i+1}, y_{i+1}) \end{bmatrix}$$

The x and y subscripts indicate the derivative of temperature in x and y directions. These derivatives may be calculated from the measurements from the selected pixels, using the finite difference method. For example, $$T_x(x_i, y_i) = \frac{T(x_{i+1}, y_i) - T(x_{i-1}, y_i)}{2d_x}$$

Where $d_x$ is the x-distance between two adjacent selected pixels with thermal sensors or selected pixels with voltage readings.

Another method is Kriging (Wiener-Kolmogorov Prediction) which is a least square estimation method that interpolates the temperature of each pixel as a linear weighted sum of all temperature measurements, as follows:

$$T(z^*) = \sum_{i=1}^{n} \lambda_i(z^*) T(z_i)$$

In this equation, $T(z^*)$ is the temperature of the pixel of interest, $T(z_i)$ are measured temperatures by n sensors or derived from the voltage output of selected n pixels. $\lambda_i(z^*)$ are the coefficients of Kriging. The assumption of Kriging is that the random field is spatially correlated. This is a valid assumption for temperature profile as the temperature is a low pass filtered 2-D signal of power consumption in space domain. The low pass filtering removes the high frequency harmonies and leave the thermal profile with low frequency harmonies leading to high correlation among close pixels. The closer the pixels are, the higher is the correlation.

The Kriging coefficients may be calculated using the variogram of temperature. The variogram between two points $z_1$ and $z_2$ is defined as $\gamma(z_1, z_2)=E[(T(z_1)-T(z_1))^2]$ $$\begin{bmatrix} \lambda_1(z^*) \\ \vdots \\ \lambda_n(z^*) \\ \mu \end{bmatrix} = \begin{bmatrix} \gamma(z_1, z_1) & \cdots & \gamma(z_1, z_n) & 1 \\ \vdots & \ddots & \vdots & \vdots \\ \gamma(z_n, z_1) & \cdots & \gamma(z_n, z_n) & 1 \\ 1 & \cdots & 1 & 0 \end{bmatrix}^{-1} \times \begin{bmatrix} \gamma(z_1, z^*) \\ \vdots \\ \gamma(z_n, z^*) \\ 1 \end{bmatrix}$$

The Kriging coefficients may be pre-calculated and stored in memory coupled to the controller 112 to reduce the interpolation computation cost to evaluation of an additive equation as explained above.

Whether a very simple interpolation method such as bilinear or a very complex one such as bicubic is used, the required computation increases for a full panel display with millions of pixels. However, the temperature profile has a large time-constant and therefore the thermal profile of panel may be updated progressively as the video is processed.

An alternative method of determining the temperature profile of the pixels calculates the thermal profile from the video data from the AMOLED display system 100. The temperature profile is obtained via video data from the AMOLED display system 100 as follows. The heat conduction and temperature are governed by the following heat diffusion equation:

$$\rho c_p \frac{\partial T(x, y, z, t)}{\partial t} - \nabla \cdot (k(x, y, z, T)\nabla T(x, y, z, t)) = P(x, y, z, t) \quad (1)$$

with two boundary conditions depending on the packaging material and surrounding environment. For the insulated condition:

$$\frac{\partial T(x, y, z, t)}{\partial n_i} = 0 \quad (2)$$

and for the convective condition $$k(x, y, z, T)\frac{\partial T(x, y, z, t)}{\partial n_i} = h(T(x, y, z, t) - T_a) \quad (3)$$

Where T is the temperature in Celsius, P is the power density in Watts per meters$^3$, k is the thermal conductivity W° C./m$^3$ $\rho$ is the density of the material (kg/meters$^3$), $c_p$ is the specific heat $$\frac{J}{(Kg, °C.)},$$

$h_i$ is the convective heat transfer coefficient, and $n_i$ is the outward direction normal to the surface of i.

Figure 6:
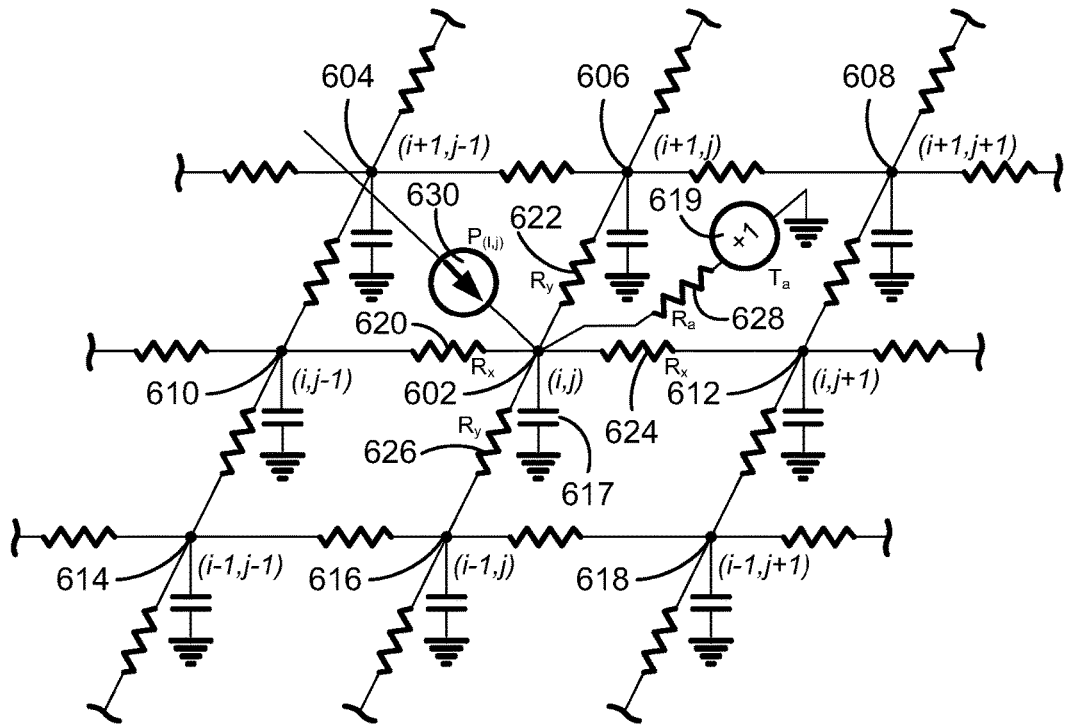
FIG. 6 is an equivalent circuit model for another method of thermal compensation for the AMOLED display in FIG. 1.

By using the finite difference method (FDM), the partial differential equation of (1) may be reduced to an equivalent circuit analysis problem and solved numerically by the model circuit 600 in FIG. 6. In such a model, capacitances and resistances are used to model material specific heat, density, conduction, and environment convection. The power consumption and temperature are also modeled by current sources and nodal voltages. In this manner the thermal effect may be calculated from video data. The video data determines the power consumption of each pixel, therefore, by solving the equivalent circuit of FIG. 6, the thermal profile which is equivalent to nodal voltage profile is calculated. The calculation may be performed by the controller 112 in FIG. 1, but other hardware and/or software may perform the computations such as a video processor or a digital signal processor on a device coupled to the display system 100.

The thermal-model equivalent electrical circuit 600 of a pixel (i, j) such as the pixel node 602 surrounded by 8 neighboring pixel nodes 604, 606, 608, 610, 612, 614, 616 and 618 is shown in FIG. 6. Each node 602, 604, 606, 608, 610, 612, 614, 616 and 618 thus represents a pixel. The node 602 has a series of resistors 620, 622, 624 and 626 each of which represent the model of thermal components from other nodes 610, 606, 612 and 616, respectively representing other pixels around the pixel represented by the node 602.

It is assumed that each pixel such as the node 602 has width, length, and substrate thickness of w, l, t meters. Then, the temperature $T_a$ of the pixel (i,j) consuming power density of $P_{(i,j)}$ is equivalent of the voltage of that node, if:

$$C = \rho c_p w l t \quad (4)$$

$$R_x = \frac{w}{klt}$$

$$R_y = \frac{l}{kwt}$$

$$R_a = \frac{1}{hwl}$$

In this example the $R_x$ value is expressed in resistors 620 and 624, $R_y$ is expressed in resistors 622 and 626, and $R_a$ is expressed in a resistor 628. The power density $P_{(i,j)}$ is modeled as a power source 630. The temperature of the node $T_a$ is modeled as a voltage source 632 and is solved for by the electrical circuit model 600.

The circuit 600 in FIG. 6 is repeated in x and y directions of the array 102 in FIG. 1 until reaching the edges of the panel. If the edges are considered to be thermally insulated, the lateral resistances at the edge pixels to the outside are set to zero. The convection resistance ($R_a$) is temperature dependent.

Once such a model is produced, the thermal profile may be constructed for a video stream based on the power consumption characteristic of a pixel such as the pixel 104a in FIG. 1 in terms of displaying gray-level light intensity. However, the exact nodal analysis of such a large mesh with millions of electrical elements is impractical in real-time (60 image frames or more in a second). The thermal profile may be considered as a low pass filtered signal of the power consumption profile, both in time and space. The thermal conduction/convective resistance network is capable of eliminating and damping the thermal effect of locally high power consumption patterns and flattens the temperature profile. This may be counted as a low pass filtering of the power consumption profile in x-y space. The thermal capacitances are also responsible to damp the effect of temporal power consumption spikes and low pass filtering in time.

In a steady-state case (zero thermal capacitances or time-invariant power consumption profile), a 2-D system transformation function can be constructed to extract the steady-state thermal profile from a pixel. In that case, the 2-D Discrete Cosine Transformation (DCT) of the power consumption is multiplied with such a system transformation function. The output of such a transformation can then be inverse discrete cosine transformed to obtain the steady-state thermal profile. Such a 2-D system transformation function may be generated using the Green function-based solution of thermal equations. Moreover, in the transient case, the thermal behavior of each pixel can be approximated with a very low-order time-domain filer using a model order reduction technique for an integrated circuit.

Figure 7:
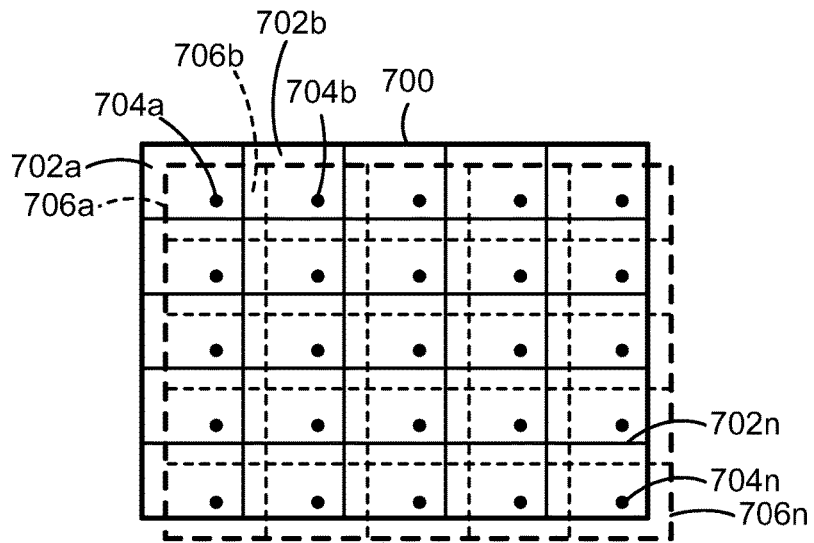
FIG. 7 is a diagram of a thermal sensor grid for one mechanism of thermal compensation for the AMOLED display in FIG. 1.

Since temperature profile is basically a low pass filtered of power consumption profile, in space and time domains the following algorithm may be used to significantly reduce the computational cost of the thermal profile extraction of OLED displays, to enable real-time thermal profile extraction by only performing the transformation for selected pixels in the display system 100. FIG. 7 is a graphic of the display 700 showing the process of dividing the display 700 and selecting certain pixels for thermal profile extraction from the power levels of pixels in the AMOLED display.

The array of pixels of the display 700 is divided to M×K squares 702a, 702b, to 702n as shown by the solid lines in FIG. 7. Each of the M×K squares contains N×N pixels. A pixel such as the pixel 704a is randomly selected from the square 702a of N×N pixels. Pixels 704b . . . 704n with the same local location within the grid squares M×K 702b . . . 702n as the pixel 704a are selected as shown by the solid points 704b . . . 702n in FIG. 7. A set of new N×N pixel squares 706a, 706b . . . 706n are created such that each selected pixel 704 is placed in the middle of each new square 706a, 706b . . . 706n. The new squares 706a, 706b . . . 706n are shown by dashed lines in FIG. 7. A new frame is then fetched and the power consumption of each selected pixel 704a-704n is calculated.

The power consumption of all pixels in each dashed-line square 706a, 706b . . . 706n in FIG. 7 is assumed to be equal to the power consumption of the selected (middle) pixel 704a, 704b . . . 704n. Steady-state thermal analysis is performed for the assumed course-grain squares 706a, 706b . . . 706n in FIG. 7, by applying the low resolution DCT-based transformation. For example, if the 2-D transformation matrix of the display (obtained from green-function based analysis) is $F_{M \times K}$, and the power consumption is $P_{M \times K}$, then the steady-state temperature is:

$$T_s = \text{IDCT}(\text{DCT}(P_{M \times K}) * F_{M \times K}) + T_e$$

Where $T_e$ is the environment temperature, and '*' is element-wise multiplication of two matrices. DCT and IDCT are the discrete cosine transform and the inverse-DCT operations.

The full resolution steady-state temperature profile for the other pixels in the squares 706a-706n is constructed by nearest-neighbor, bilinear, or bicubic interpolation from the profiles of the selected pixels 704a-704n by the general process explained above. The steady-state (infinite-time) response is then used to calculate the temperature of each pixel, at the end of the current frame, by using the reduced-order time-domain (temporal) thermal model. For example, if the temporal model is a first-order model, the temperature at the end of current frame is:

$$T = T_o + (T_s - T_o)\left(1 - e^{-\frac{t_f}{\tau}}\right) \quad (6)$$

where $T_o$ is the temperature profile at the beginning of the frame and $t_f$ is the duration of the frame. The controller then loops back to randomly select another pixel within the grids 702a-702n in the array 700. A new set of squares is then centering on randomly selected pixel. In this manner, distortions due to localized temperatures may be minimized.

The above described methods of determining temperature of the pixels in the array may be performed by a processing device such as the 112 in FIG. 1 or another such device which may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the controllers described herein. Accordingly, principles and advantages of distributed processing, such as redundancy, replication, and the like, also can be implemented, as desired, to increase the robustness and performance of controllers described herein.

The operation of the example temperature determination methods may be performed by machine readable instructions. In these examples, the machine readable instructions comprise an algorithm for execution by: (a) a processor, (b) a controller, and/or (c) one or more other suitable processing device(s). The algorithm may be embodied in software stored on tangible, non-transient media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, any or all of; the components of the temperature determination methods could be implemented by software, hardware, and/or firmware. Also, some or all of the machine readable instructions represented may be implemented manually.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A semiconductor device, comprising:
   a plurality of pixels arranged in an array, the plurality of pixels including one or more first pixels, one or more second pixels different from the one or more first pixels, and a pixel different from the one or more first pixels and the one or more second pixels; and a controller for programming the pixel to control the brightness of the pixel, and for estimating a temperature of the pixel at a first time with use of one or more pixel temperatures determined only for the one or more first pixels, and for estimating a temperature of the pixel at a second time different from the first time with use of one or more pixel temperatures determined only for the one or more second pixels.

2. The semiconductor device of claim 1 wherein the controller is further for determining the one or more pixel temperatures of the one or more first pixels and determining the one or more pixel temperatures of the one or more second pixels, and wherein the one or more first pixels are in the form of a first spaced array, and the one or more second pixels are in the form of a second spaced array, spaced away from and substantially similar to the first spaced array.

3. The semiconductor device of claim 2 wherein the one or more first pixels and a spacing of the first spaced array away from the second spaced array are randomly determined.

4. The semiconductor device of claim 1 wherein the one or more first pixels and the one or more second pixels are randomly determined.

5. The semiconductor device of claim 1, wherein the estimating is performed by interpolating the determined one or more pixel temperatures of the one or more first pixels or the one or more second pixels to the pixel, the interpolation including one of nearest neighbor, bilinear, bicubic or Kriging.

6. The semiconductor device of claim 1, wherein the controller compensates the programming of the pixel to offset the effect of the estimated temperatures on the pixel.

7. The semiconductor device of claim 1, further comprising one or more thermal sensors each respectively in proximity to one pixel of the one or more first pixels or one pixel of the one or more second pixels and for use by the controller for determining the one or more pixel temperatures of the one or more first pixels and determining the one or more pixel temperatures of the one or more second pixels.

8. The semiconductor device of claim 1, wherein the controller is further for determining the one or more pixel temperatures of the one or more first pixels and determining the one or more pixel temperatures of the one or more second pixels, and wherein during at least one blank frame a gate terminal of a drive transistor of each of the one or more first pixels and each of the one or more second pixels is charged to a calibration voltage via a data line input to produce an output voltage having a change in value used by the controller to determine the pixel temperatures of each of the one or more first pixels and each of the one or more second pixels.

9. The semiconductor device of claim 1, wherein each pixel includes a drive transistor and an organic light emitting device coupled to the drive transistor, each drive transistor having a gate, and wherein the controller causing a programming voltage to be applied to the gate of the respective drive transistors to control the brightness of each pixel.

10. The semiconductor device of claim 9, wherein the one or more pixel temperatures of the one or more first pixels and the one or more second pixels is determined by the controller using a finite difference model to reduce a differential equation of pixel power to an equivalent circuit, the equivalent circuit being based on measured power of each pixel and the dimensions of the OLED to solve for a voltage equivalent model of pixel temperature.

11. A method of determining temperature of a pixel of a display including a controller and a plurality of pixels arranged in an array, the plurality of pixels including the pixel, one or more first pixels different from the pixel, and one or more second pixels different from the pixel and the one or more first pixels, the pixel programmed by the controller to control the brightness of the pixel, the method comprising:

estimating by the controller a temperature of the pixel at a first time with use of one or more pixel temperatures determined only for the one or more first pixels and estimating by the controller a temperature of the pixel at a second time different from the first time with use of one or more pixel temperatures determined only for the one or more second pixels.

12. The method of claim 11 further comprising determining the one or more pixel temperatures of the one or more first pixels and determining the one or more pixel temperatures of the one or more second pixels, and wherein the one or more first pixels are in the form of a first spaced array, and the one or more second pixels are in the form of a second spaced array, spaced away from and substantially similar to the first spaced array.

13. The method of claim 12 wherein the one or more first pixels and a spacing of the second spaced array away from the first spaced array are randomly determined.

14. The method of claim 11 wherein the one or more first pixels and the one or more second pixels are randomly determined.

15. The method of claim 11, wherein the estimating is performed by interpolating the determined one or more pixel temperatures of the one or more first pixels or the one or more second pixels to the pixel, the interpolation including one of nearest neighbor, bilinear, bicubic or Kriging.

16. The method of claim 11, further comprising compensating the programming of the pixel to offset the effect of the estimated temperatures on the pixel.

17. The method of claim 11, wherein the one or more pixel temperatures of the one or more first pixels and the one or more pixel temperatures of the one or more second pixels are determined by one or more thermal sensors each respectively in proximity to one pixel of the one or more first pixels or one pixel of the one or more second pixels.

18. The method of claim 11, further comprising determining the one or more pixel temperatures of the one or more first pixels and determining the one or more pixel temperatures of the one or more second pixels, and wherein during at least one blank frame a gate terminal of a drive transistor of each of the one or more first pixels and each of the one or more second pixels is charged to a calibration voltage via a data line input to produce an output voltage having a change in value used to determine the pixel temperatures of each of the one or more first pixels and each of the one or more second pixels.

19. The method of claim 11, wherein each pixel includes a drive transistor and an organic light emitting device (OLED) coupled to the drive transistor, each drive transistor having a gate.

20. The method of claim 19, wherein the one or more pixel temperatures of the one or more first pixels and the one or more pixel temperatures of the one or more second pixels are determined by a finite difference model to reduce a differential equation of pixel power to an equivalent circuit, the equivalent circuit being based on measured power of each pixel and the dimensions of the OLED to solve for a voltage equivalent model of pixel temperature.

21. A non-transitory machine readable medium having stored thereon instructions for determining temperature of a pixel of a display including a plurality of pixels arranged in an array, the plurality of pixels including the pixel, one or more first pixels different from the pixel, and one or more second pixels different from the pixel and the one or more first pixels, the pixel programmed to control the brightness of the pixel, the non-transitory machine readable medium comprising machine executable code which when executed by at least one machine, causes the at least one machine to:
 estimate a temperature of the pixel at a first time with use of one or more pixel temperatures determined only for the one or more first pixels; and
 estimate a temperature of the pixel at a second time different from the first time with use of one or more pixel temperatures determined only for the one or more second pixels.

22. The non-transitory machine readable medium of claim 21, wherein the estimation includes interpolating the determined one or more pixel temperatures of the one or more first pixels or the one or more second pixels to the pixel, the interpolation including one of nearest neighbor, bilinear, bicubic or Kriging.

23. The non-transitory machine readable medium of claim 21, wherein the one or more pixel temperatures of the one or more first pixels and the one or more pixel temperatures of the one or more second pixels are determined by the at least one machine using a finite difference model to reduce a differential equation of pixel power to an equivalent circuit, the equivalent circuit being based on measured power of each pixel and the dimensions of the OLED to solve for a voltage equivalent model of pixel temperature.

24. The non-transitory machine readable medium of claim 21, wherein the machine executable code, when executed by the at least one machine, causes the machine to determine the one or more pixel temperatures of the one or more first pixels and determine the one or more pixel temperatures of the one or more second pixels, and wherein the one or more first pixels are in the form of a first spaced array, and the one or more second pixels are in the form of a second spaced array, spaced away from and substantially similar to the first spaced array.

* * * * *